(12) United States Patent
Lee et al.

(10) Patent No.: US 12,197,897 B2
(45) Date of Patent: Jan. 14, 2025

(54) IMAGE-BASED INFRASTRUCTURE-AS-CODE PROCESSING BASED ON PREDICTED CONTEXT

(71) Applicant: Microsoft Technology Licensing, LLC, Redmond, WA (US)

(72) Inventors: Yee Shian Lee, Singapore (SG); Julia Gusakova, Singapore (SG); Brain Vito Chin, Singapore (SG)

(73) Assignee: Microsoft Technology Licensing, LLC, Redmond, WA (US)

( * ) Notice: Subject to any disclaimer, the term of this patent is extended or adjusted under 35 U.S.C. 154(b) by 180 days.

(21) Appl. No.: 17/869,807

(22) Filed: Jul. 21, 2022

(65) Prior Publication Data

US 2024/0028308 A1    Jan. 25, 2024

(51) Int. Cl.
*G06F 8/34*    (2018.01)
*G06T 1/20*    (2006.01)
*H04L 41/0806*    (2022.01)

(52) U.S. Cl.
CPC .............. *G06F 8/34* (2013.01); *G06T 1/20* (2013.01); *H04L 41/0806* (2013.01)

(58) Field of Classification Search
CPC .......... G06F 8/34; G06T 1/20; H04L 41/0806
See application file for complete search history.

(56) References Cited

U.S. PATENT DOCUMENTS

| 8,572,612 | B2 | 10/2013 | Kern |
| 8,595,693 | B2 * | 11/2013 | Berg .................... G06F 8/61 717/106 |
| 8,762,937 | B2 * | 6/2014 | Berg .................... G06F 8/61 717/106 |
| 8,819,672 | B2 | 8/2014 | Joukov et al. |

(Continued)

FOREIGN PATENT DOCUMENTS

WO    2020072872 A1    4/2020

OTHER PUBLICATIONS

Search Report and Written Opinion for PCT/US2023/024661, listed date of mailing: Sep. 18, 2023, 17 pages.

(Continued)

*Primary Examiner* — S. Sough
*Assistant Examiner* — Zheng Wei

(57) ABSTRACT

A process automatically generates configuration information used to build a target computing environment based on an image that depicts an architecture of the target computing environment. First, the process generates an original graph data structure having nodes and edges that respectively represent services and connectors detected in the image. The system then determines attributes of the target computing environment based on the original graph data structure. At least in part, the attributes describe a context in which the target computing environment is used, such as the type of industry associated with the target computing environment. The process then modifies the original graph data structure based on the attributes that have been determined, to pro- (Continued)

duce a modified graph data structure. Finally, the process provides the configuration information to a deployment system, which uses the configuration information to deploy the target computing environment on a computing platform.

19 Claims, 12 Drawing Sheets

(56) References Cited

U.S. PATENT DOCUMENTS

| | | | | |
|---|---|---|---|---|
| 9,182,952 | B2* | 11/2015 | Qi | G06F 8/35 |
| 10,574,588 | B2 | 2/2020 | Grabarnik et al. | |
| 10,579,344 | B2* | 3/2020 | Krishnan | G06V 30/422 |
| 10,997,409 | B1 | 5/2021 | Krishnamurthy et al. | |
| 11,025,500 | B2 | 6/2021 | Chandran et al. | |
| 11,030,548 | B1 | 6/2021 | Ding et al. | |
| 11,216,265 | B1 | 1/2022 | Hornbeck | |
| 2018/0329690 | A1 | 11/2018 | Krishnan et al. | |
| 2020/0012480 | A1 | 1/2020 | Rizo et al. | |
| 2021/0279062 | A1 | 9/2021 | Shah et al. | |
| 2022/0043800 | A1 | 2/2022 | Barnett et al. | |
| 2022/0317981 | A1* | 10/2022 | Yu | G06F 8/60 |
| 2023/0236816 | A1* | 7/2023 | Bhutani | G06F 8/65 |
| | | | | 717/169 |

OTHER PUBLICATIONS

"Infrastructure as code," available at https://en.wikipedia.org/wiki/Infrastructure_as_code, Wikpedia article, accessed on Jun. 7, 2022, 5 pages.

Sarkar, Prasenjit, "Working with Oracle Cloud Infrastructure custom compute images," available at https://blogs.oracle.com/developers/post/working-with-oracle-cloud-infrastructure-custom-compute-images, Developer's Blog, Oracle Corporation, Austin, Texas, Oct. 30, 2020, 7 pages.

"Migrate custom software to Azure App Service using a custom container," available at https://docs.microsoft.com/en-us/azure/app-service/tutorial-custom-container?pivots=container-linux, Microsoft Docs, Microsoft Corporation, Redmond, WA, Apr. 13, 2022, 19 pages.

"Security posture for Microsoft Defender for Cloud," available at https://docs.microsoft.com/en-us/azure/defender-for-cloud/secure-score-security-controls, Microsoft Docs, Microsoft Corporation, Redmond, WA, Jun. 2, 2022, 14 pages.

"Browse Azure Architectures," available at https://docs.microsoft.com/en-us/azure/architecture/browse/, Microsoft Docs, Microsoft Corporation, Redmond, WA, accessed on Jun. 7, 2022, 4 pages.

Redmon, et al., "You Only Look Once: Unified, Real-Time Object Detection," Cornell University arXiv reference library, arXiv:1506.02640v5 [cs.CV], May 9, 2016, 10 pages.

Liu, et al., "SSD: Single Shot MultiBox Detector," Cornell University arXiv reference library, arXiv:1512.02325v5 [cs.CV], Dec. 29, 2016, 17 pages.

Ren, et al., "Faster R-CNN: Towards Real-Time Object Detection with Region Proposal Networks," Cornell University arXiv reference library, arXiv:1506.01497v3 [cs.CV], Jan. 6, 2016, 14 pages.

"What is an Azure landing zone?," available at https://docs.microsoft.com/en-us/azure/cloud-adoption-framework/ready/landing-zone/, Microsoft Docs, Microsoft Corporation, Redmond, WA, accessed on Jun. 14, 2022, 6 pages.

"Microsoft Azure Well-Architected Framework," available at 01/03/2022https://docs.microsoft.com/en-us/azure/architecture/framework/, Microsoft Docs, Microsoft Corporation, Redmond, WA, Jun. 15, 2022, 10 pages.

"Microsoft Secure Score," https://docs.microsoft.com/en-us/microsoft-365/security/defender/microsoft-secure-score?view=o365-worldwide, Microsoft Docs, Microsoft Corporation, Redmond, WA, Mar. 28, 2022, 7 pages.

"What are ARM templates?", available at https://docs.microsoft.com/en-us/azure/azure-resource-manager/templates/overview, Microsoft Docs, Microsoft Corporation, Redmond, WA, May 26, 2022, 10 pages.

\* cited by examiner

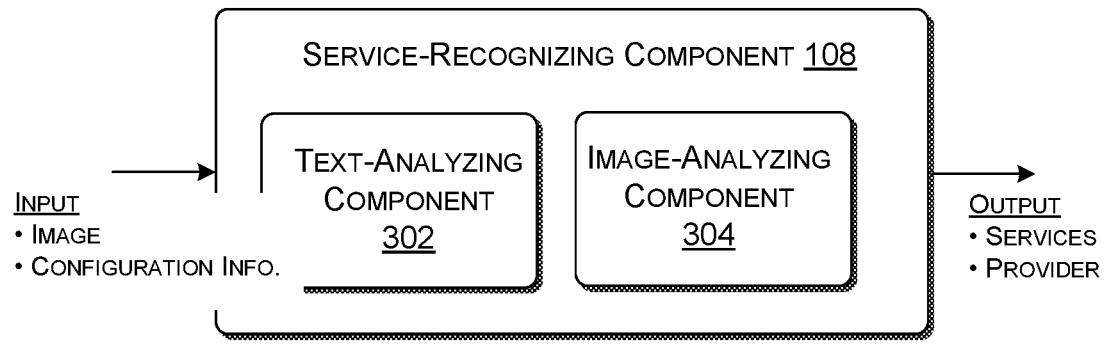
FIG. 3
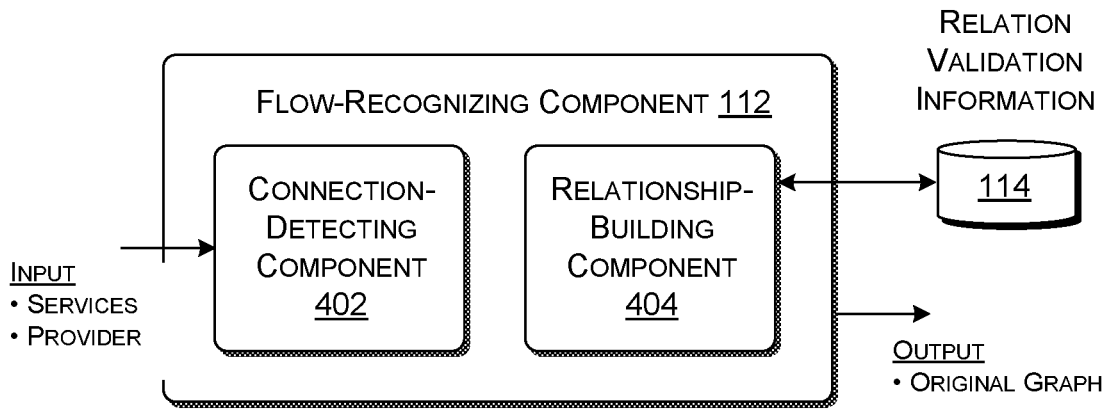
FIG. 4
502 →
| Source Node | Connector Edge | Target Node | Target Type |
|---|---|---|---|
| App Service | To | SQL DB | Data |
| App Service | From | Key Vault | Security |
| App Service | In | Subnet | Network |
| API Management | To | App Service | Compute |
| ⋮ | | | |
FIG. 5

| Industry | Segment | Deployment | Security Score |
|---|---|---|---|
| Financial | Enterprise | Production | 90 |
| Retail | SMB | Non-Prod | 50 |
| Healthcare | Corporate | Non-Prod | 90 |
| ⋮ | | | |

← 902

| Industry | Segment | Deployment | DR Score | HA Score |
|---|---|---|---|---|
| Financial | Enterprise | Production | 90 | 80 |
| Retail | SMB | Non-Prod | 50 | 60 |
| Healthcare | Enterprise | Non-Prod | 90 | 70 |
| ⋮ | | | | |

← 1002

1202 →

| Describe | Description | Priority | Remarks | Recommendations |
|---|---|---|---|---|
| Firewall | No firewall | 100 | Open to Internet traffic | Add firewall to Vnet |
| App Service | No gateway for Internet facing apps | 90 | Internet facing Apps open to Internet traffic | Add app gateway to App service |
| ⋮ | | | | |

| Source | Edge | Target | Scores | Recommendation |
|---|---|---|---|---|
| App Service | To | Key Vault | $S_1, S_2, ...$ | New target node suggested; New edge suggested; Key vault recommended |
| ⋮ | | | | |

FIG. 13

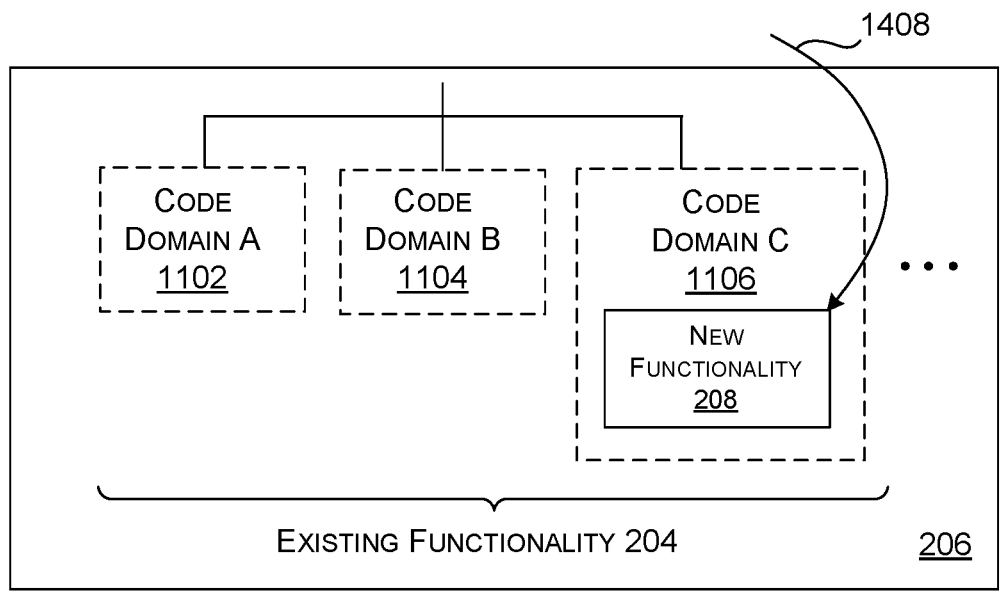

FIG. 14

CONTINUED FORM FIG. 18

AUTOMATICALLY CREATE THE CONFIGURATION INFORMATION BASED ON THE MODIFIED GRAPH DATA STRUCTURE.
2002

PROVIDE THE CONFIGURATION INFORMATION TO A DEPLOYMENT SYSTEM, THE DEPLOYMENT SYSTEM USING THE CONFIGURATION INFORMATION TO DEPLOY CODE THAT IMPLEMENTS THE TARGET COMPUTING ENVIRONMENT ON A COMPUTING PLATFORM.
2004

IMAGE-BASED INFRASTRUCTURE-AS-CODE PROCESSING BASED ON PREDICTED CONTEXT

BACKGROUND

A developer may use existing Infrastructure-as-Code tools to create a cloud-based computing system. Some of these existing tools require the user to select code fragments from a catalogue of pre-generated code fragments. Other tools ask the user to engage in a dialogue with an automated agent, which solicits information regarding the computing system that the user is attempting to build. Still other tools provide automated assistance as the user manually builds the system, such as auto-complete tools and recommendation tools. All of these tools facilitate the creation of a computing system, e.g., compared to an ad hoc approach of writing the code from scratch.

Nevertheless, the existing tools still require a significant amount of effort from the end user. For instance, the user may be required to learn the syntax of a computer language that is used to declaratively describe a computing system. Once the user has gained familiarity with the tools, the user must spend a significant amount of time and effort in interacting with them. These operations are cumbersome and may introduce error in the process of building a computing system. In addition, the tools may generate a computing system that is deficient in one or more respects, e.g., because it exhibits substandard performance, vulnerabilities, and/or other design flaws.

SUMMARY

A computer-implemented technique is described herein for generating configuration information used to build a target computing environment based on an image that depicts an architecture of the target computing environment. First, the technique automatically detects the services and connectors shown in the image. The technique then constructs an original graph data structure having nodes and edges that represent the services and connectors that have been detected. The technique then determines attributes of the target computing environment based on at least the original graph data structure. At least in part, the attributes describe a context in which the target computing environment is used. The technique then modifies the original graph data structure based on the attributes that have been determined, to produce a modified graph data structure. The technique then generates configuration information based on the modified graph data structure. The configuration information is provided to a deployment system, which uses the configuration information to deploy code that implements the target computing environment on a computing platform.

According to one illustrative aspect, one or more operations performed by the technique use machine-trained logic. The machine-trained logic can perform image-based and/or text-based analysis.

According to another illustrative aspect, the context in which the target computing environment is used is described by at least: a type of industry in which the target computing environment is used; a type of organizational entity that uses the target computing environment; and a stage of development in which the target computing environment is used.

According to another illustrative aspect, the attributes also include at least one attribute that specifies a size of the target computing environment.

According to another illustrative aspect, the technique can modify the original graph data structure with the specific intent of improving the security, reliability, and/or monitoring capability of the target computing environment over a state of the architecture depicted in the image. Note that the attributes on which the modifications are made may not be explicitly specified in the image, but rather may be inferred based on evidence collected from other instances of related computing systems. This insight is encapsulated in the attributes that are determined. In addition, the technique can correct any inaccuracies that are detected in the architecture shown in the image.

Overall, the technique reduces the amount of user interface actions required by the user to generate the configuration information. The technique also improves the quality of the target computing environment that is generated, e.g., compared to a target computing environment manually built by a user in ad hoc fashion from scratch.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 specifically shows functionality for converting a modified graph structure produced by the IAC system into code, and then deploying the code on a computing platform.

FIG. 3 shows one implementation of a service-recognizing component, which is a part of the IAC system of FIG. 1.

FIG. 4 shows one implementation of a flow-recognizing component, which is another part of the IAC system of FIG. 1.

FIG. 5 shows an example of relation validation information that is used by the flow-recognizing component of FIG. 4 to validate detected relations.

FIG. 12 shows illustrative rules accessible to one implementation of a security component. The security component, in turn, is part of the graph-supplementing component of FIG. 11.

FIG. 13 shows an illustrative recommendation generated by the graph-supplementing component of FIG. 11.

FIG. 14 shows an illustrative organization of existing code on a computing platform, on which a deployment system of FIG. 2 deploys new code.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative computing system for assisting a user in building a target computing environment. Section B sets forth illustrative methods that explain the operation of the computing system of Section A. Section C describes illustrative computing functionality that can be used to implement any aspect of the features described in Sections A and B.

A. Illustrative Image-Based IAC System

Figure 1:
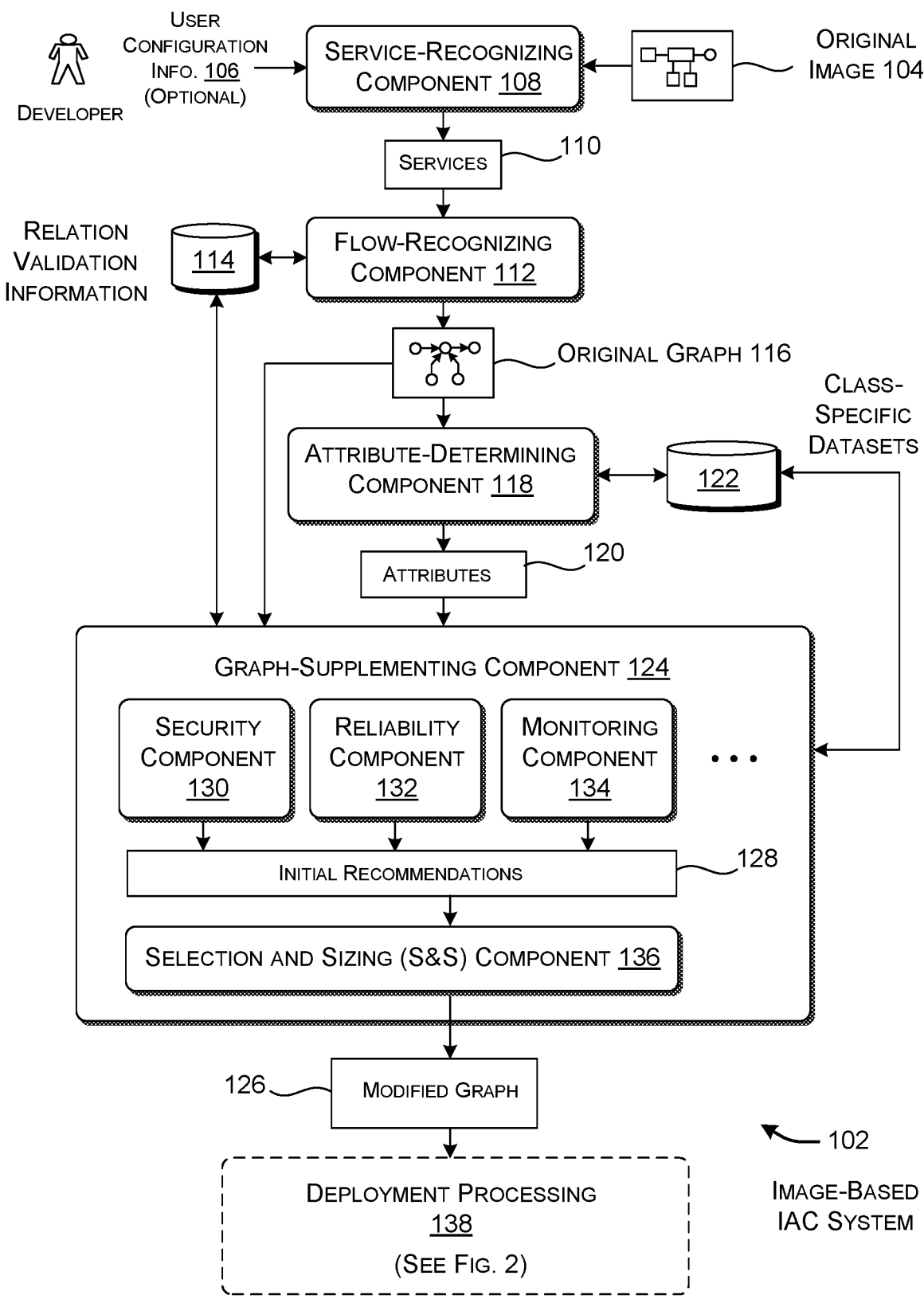
FIG. 1 shows an illustrative computing system that assists a user in creating a target computing environment. The computing system shown in FIG. 1 is referred to herein as an image-based infrastructure-as-code (IAC) system.
Figure 2:
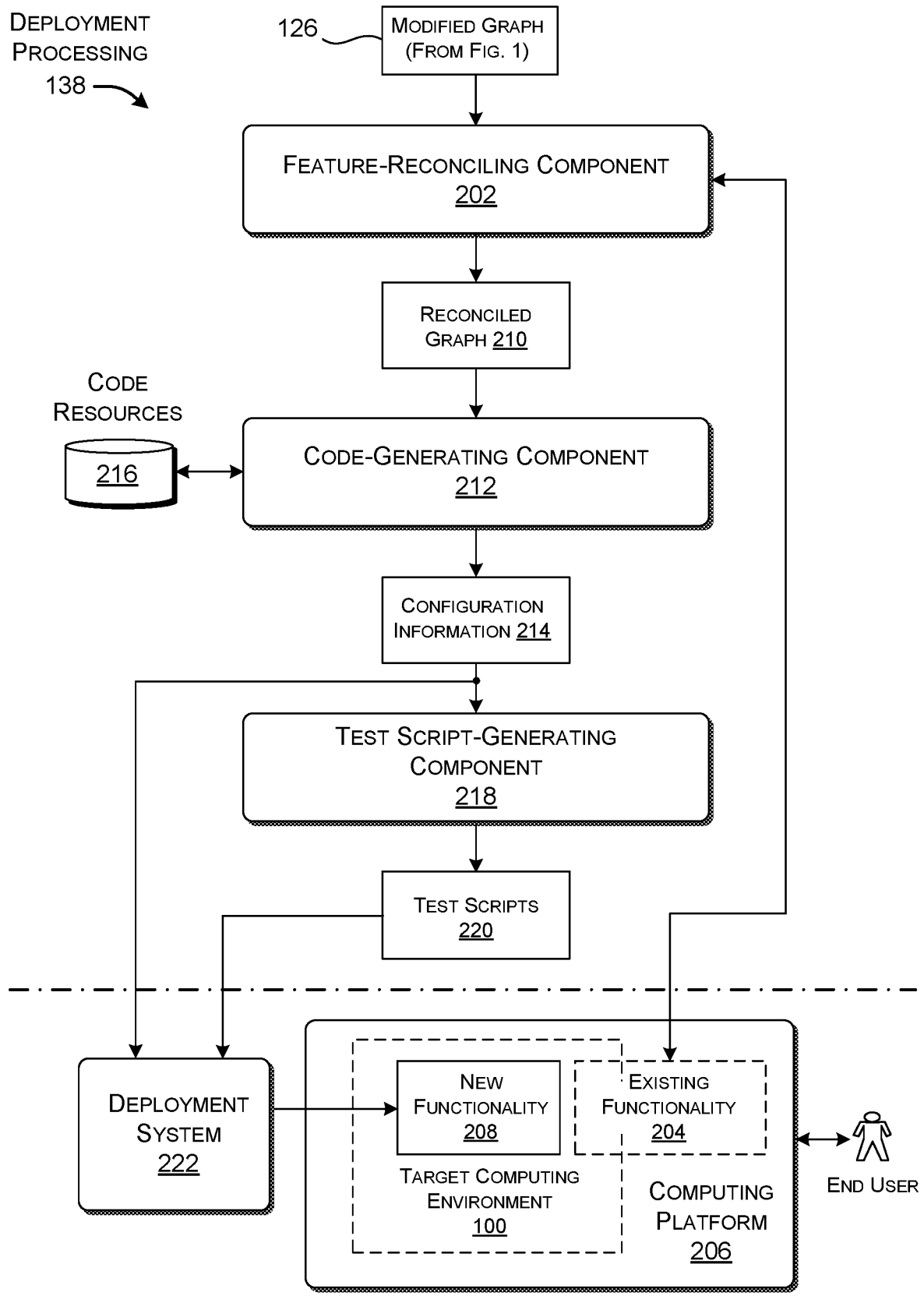
FIG. 2 shows additional features of the IAC system of FIG. 1.

FIG. 1 shows an illustrative image-based infrastructure-as-code computing system (or IAC system 102 for brevity) that assists a user in generating configuration information that is used to build a target computing environment 100 (shown in FIG. 2). The qualifier "target" means that the computing environment is the objective or end goal of the design process. A computing environment refers to a framework in which a computing solution operates. The target computing environment 100 encompasses different aspects of the computing solution, including: the devices used by the computing solution (e.g., servers, routers, load balancers, routing devices); the application logic used by the computing solution; the database(s) used by the computing solution; the network infrastructure (e.g., the cloud infrastructure and its configuration) used by the computing solution; the architecture used by the computing solution, by which its various resources are organized; and the definitional framework associated with the computing solution, such as its policies, configuration settings, groups, privileges, and tags. The target computing environment 100 can perform any function(s) and can have any scale.

In most of the examples presented herein, the target computing environment 100 that is created implements one or more applications that run on a cloud computing platform. A cloud computing platform is a system that provides a distributed set of computing and storage resources, accessible via a wide area network (such as the Internet). Once deployed, customers, such as members of the public, may interact with the applications via the Internet. A hosting entity manages the computing platform, and is typically different than the various entities that develop and run the applications on the computing platform, typically on a subscription basis. But the principles set forth herein also apply to other contexts, such as the case in which an entity uses the technology described herein to develop a standalone network-accessible system for private use by its employees and/or customers. Here, the entity that develops the network-accessible system is the same entity that subsequently manages it. More generally, the entity who interacts with the IAC system 102 is referred to below as a "developer," and the developer may correspond to a single person or team of individuals. The person who interacts with the deployed target computing environment 100 is referred to as the "end user," or simply "user."

The IAC system 102 begins its workflow by receiving an image 104 from the developer that depicts the architecture of the target computing environment 100 to be built. In most cases, the image 104 will generally show icons that represent respective services used in the architecture, and connectors that represent relationship among the services. The image 104 can be expressed in any format, such as formats having the file extensions .jpg, .png, .pdf, or any other extension. The image 104 can be produced by any source application, such as the VISIO graphics program provided by MICROSOFT CORPORATION of Redmond, Washington. Alternatively, the image 104 may represent a picture of a hand-drawn architectural diagram taken by a camera. However, in many cases, the developer who submits the image 104 is not himself or herself the creator of the architecture shown in the image 104. For instance, the developer may download the image 104 from a public repository of images produced by various architects. The developer may have no further insight into the thinking of the person or team that created the image 104. The image 104 may also be incomplete, insofar as the image 104 omits details that will be needed to build a viable target computing environment 100. The image 104 may also contain inaccuracies, such as incorrect connections between components.

The IAC system 102 may optionally receive a relatively small set of parameters from the developer, shown in FIG. 1 as user input information 106. For instance, a first parameter may provide a security-related score that describes a preferred level of security readiness of the target computing environment 100 being designed (e.g., ranging from 0 to 100 percent). A score of 100 indicates that the developer places a maximum priority on developing a network design that meets security design features accepted as good practices. A second parameter may describe a region in which the target computing environment 100 is to be deployed. In the absence of the developer specifying this parameter, the IAC system 102 will choose a location closest to a known location of the developer. A third parameter indicates whether the target computing environment 100 is required to satisfy any specific regulatory demands, such as those specified by HIPAA (the Health Insurance Portability and Accountability Act). Other implementations can receive other parameters from the developer, such as one or more parameters that convey cost constraints. In some implementations, the IAC system 102 does not solicit any additional information from the developer throughout the design process. Other implementations of the IAC system 102, however, can invite the user to confirm automated recommendations at selected junctures in the design process. More generally, the IAC system 102 provides a fully automated experience that does not engage in a laborious dialogue with the developer, in contrast to other automated tools driven by agents. The IAC system 102 further frees the user from the task of manually selecting snippets of code from libraries and then assembling those snippets of code, in contrast to other automated tools.

The IAC system 102 analyzes the image 104 in a series of stages. Each stage builds on insight provided by its preceding stage(s). First, a service-recognizing component 108 performs, in any order, text-based and image-based analysis of the image 104 to identify a set of services 110 shown in the image 104. A service refers to a recognized unit of logic that performs any function(s). Illustrative services include applications, SQL databases, virtual networks, and so on.

A flow-recognizing component 112 performs text-based and image-based analysis of the image 104 to identify the connectors in the image 104. The connectors represent relations among the services 110, such as the transfer of data from one service to another, or the containment of one service inside another service. The flow-recognizing component 112 then identifies candidate relations between the detected services 110, each of which has the form service1-connector-service2 to designate a connector that couples a first service (service1) to a second service (service2). The flow-recognizing component 112 validates the candidate relations based on relation validation information provided in a data store 114. In some implementations, the relation validation information identifies a set of relations that are known to be valid. As such, the flow-recognizing component 112 can disqualify an identified relation if no counterpart to this relation is found in the data store 114. Based on its analysis, the flow-recognizing component 112 generates an original graph data structure 116 (abbreviated in the figures as an "original graph"). The original graph data structure 116 includes nodes and edges that represent the detected services, connectors, and relations.

Further illustrative details regarding the logic and operation of the service-recognizing component 108 is provided below in the explanation of FIG. 3. Further information regarding the logic and operation of the flow-recognizing component 112 is provided below in the explanation of FIGS. 4 and 5. Further information regarding the construction of the original graph data structure 116 is provided below in the explanation of FIG. 6.

An attribute-determining component 118 identifies a set of attributes 120 that describe aspects of the target computing environment 100 being designed. More specifically, a first subset of these attributes describe describes the context in which the target computing environment 100 is likely to be used. These attributes, for instance, may describe: the type of industry with which the target computing environment 100 is likely to be associated (e.g., finance, government, healthcare, retail, manufacturing, or automotive); the type of business organization that will likely use the target computing environment 100 (e.g., enterprise, corporate, small-to-medium business, or other business kind); and the stage of development in which the target computing environment 100 is likely to be used (e.g., production, non-production, systems user acceptance testing (UAT), or other stage). A second subset of attributes describe the likely size of the target computing environment 100 being developed. A third subset of attributes describe various benchmarks, norms, exceptions, etc. associated with the target computing environment 100 being designed. Further information regarding the attributes 120 produced by the attribute-determining component 118 is set forth below in connection with the explanation of FIGS. 7 and 8. As used herein, the term "attribute" is a shorthand reference to an attribute value (e.g., "finance" being an attribute value for the attribute category "industry"). Similarly, threshold means threshold value, and parameter means parameter value.

In some implementations, the attribute-determining component 118 can determine the attributes 120 from one or more datasets provided in a data store 122. The datasets generally provide an empirical summary of the features and attributes associated with different classes of target computing environments. In some implementations, each class encompasses different target computing environments associated with a particular type of industry, a particular type of organization, and a particular type of deployment environment. For example, one class provides target computing environment examples, benchmarks, norms, etc. for a production-stage system used by a corporation in the field of finance. Other implementations can use other criteria to define classes. A dataset-generating component (not shown in FIG. 1) can produce each dataset associated with a particular class by extracting the properties of many observed examples of target computing environments associated with this particular class.

A graph-supplementing component 124 leverages the attributes 120 identified by the attribute-determining component 118 to modify the original graph data structure 116, to produce a modified graph data structure 126 (abbreviated in FIG. 1 as a "modified graph"). For instance, the graph-supplementing component 124 can add one or more new nodes to the original graph data structure 116 associated with one or more services to be added to the target computing environment 100 being built. In addition, or alternatively, the graph-supplementing component 124 can add one or more new edges to the original graph data structure 116 associated with one or more connectors to be added to the network structure being built. In addition, or alternatively, the graph-supplementing component 124 can remove one or more nodes and/or edges from the original graph data structure 116.

As a general principle, the graph-supplementing component 124 modifies the original graph data structure 116 for the purpose of enhancing the architecture that is depicted in the original image 104, with respect to one or more categories of performance. These improvements are generally neither directly nor indirectly expressed in the original image 104, but are rather inferred from the insights provided by the attribute-determining component 118. The graph-supplementing component 124 also corrects any errors detected in the architecture that is depicted in the image 104.

The graph-supplementing component 124 can include plural submodules that enhance the original graph data structure 116 for different respective design goals. Each of these submodules generates zero, one, or more recommendations relating to its design goal domain, which contribute to a set of initial recommendations 128. For instance, a security component 130 recommends modifications to the original graph data structure 116 with the intent of improving the level of security exhibited by the target computing environment 100 being developed. A reliability component 132 recommends modifications to the original graph data structure 116 with the goal of improving the reliability of services offered by the target computing environment 100. A monitoring component 134 recommends modifications to the original graph data structure 116 for the purpose of improving the target computing environment's ability to track its operation, report anomalous conditions, etc. Additional information regarding the operation of the graph-supplementing component 124 is provided below in the explanation of FIGS. 11-13.

The graph-supplementing component 124 includes a selection and sizing component (S&S) 136 that selects a final set of recommendations from the initial set of recommendations based on various considerations, as set forth below. The S&S component 136 also specifies various size-related attributes that will determine the size of the target computing environment 100 that is deployed, as also set forth below. The S&S component 136 can annotate the nodes of the modified graph 126 with these size-related attributes. The S&S component 126 can also specify the use of auto-scaling in those environments in which this capability is supported.

A deployment-processing pipeline 138 generates configuration information based on the modified graph data structure 126, which a deployment system uses to implement the target computing environment 100. Advancing to FIG. 2, a feature-reconciling component 202 determines whether there is any preexisting functionality 204 on a computing platform 206 that may have a bearing on the deployment of any new functionality 208 that will be required to build the target computing environment 100 (which has not yet been deployed at this stage). For instance, consider the circumstance in which the developer is developing the target computing environment 100 to implement a new application that will provide its services alongside a suite of existing applications running on the computing platform 206, which were previously deployed by the same developer. The feature-reconciling component 202 will perform the operations of: identifying the existence of the existing functionality 204; identifying a domain of the existing functionality 204 in which the new functionality 208 will be added; identifying the existing resources of the existing functionality 204 that will have a bearing on the deployment of the new functionality 208; identifying any conflicts between the existing resources and the new functionality 208; and changing the modified graph data structure 126 to resolve the identified discrepancies. The feature-reconciling component 202 can compare the existing functionality 204 with the new functionality 208 on any level of analysis, e.g., by probing the existing functionality 204 to determine its features, and comparing the features it discovers with the features required by the modified graph data structure 126.

The feature-reconciling component 202 can perform its functions based on a data store (not shown) of rules and/or using machine-trained logic. In some cases, the feature-reconciling component 202 will determine that the modified graph data structure 126 implements one or more features that are already present in the existing functionality 204. The feature-reconciling component 202 may address this circumstance by omitting any redundant nodes and edges in the modified graph data structure 126. Alternatively, or in addition, the feature-reconciling component 202 may conclude that the modified graph data structure 126 specifies architectural features, connections, and/or parameters that are inconsistent with the configuration of the existing functionality 204. The feature-reconciling component 202 can address this circumstance in an environment-specific manner, e.g., by allowing the choices made in the modified graph data structure 126 to override the configuration of the existing functionality 204. This may be an appropriate course of action because the modified graph data structure 126 embodies preferred design principles embraced by many other related target computing environments. As a result of its processing, the feature-reconciling component 202 produces a reconciled graph data structure 210 (shortened in FIG. 2 to "reconciled graph").

A configuration-generating component 212 converts the reconciled graph data structure 210 into configuration information 214. The configuration information 214 declaratively describes the services and connections represented by the reconciled graph data structure 210. In one non-limiting implementation, the computing platform 206 is the AZURE cloud computing platform provided by MICROSOFT CORPORATION, and the configuration information 214 is expressed using Azure Resource Manager (ARM) templates, Bicep templates, etc. In other cases, the configuration information 214 is expressed using Terraform templates, etc. Terraform is a platform-agnostic scripting language developed by HASHICORP, INC. of San Francisco, California.

More generally, the configuration-generating component 212 can generate the configuration information 214 by mapping the nodes and edges in the reconciled graph data structure 210 to program instructions. To perform this task, the code-generating component 212 can make reference to pre-generated code resources in one or more data stores 216. For instance, the code resources can include schemas that describe the programming language in which the configuration information 214 is to be expressed. The code resources can also include mapping logic (e.g., lookup tables, rules, machine-trained logic, or other mapping logic) for mapping particular graph features to pre-generated code fragments. An optional test script-generating component 218 generates test scripts 220 that can be used to test the new functionality 208 once it is deployed in the computing platform 206. The test script-generating component 218 can perform this task by identifying pre-generated test scripts that are appropriate to test the kinds of functions performed by the new functionality 208. For example, for an application with a data backup requirement from a SQL database to blob storage, the test script-generating component 218 can identify a pre-generated test script that performs tests to ensure that the correct configurations are in place to perform this function.

The IAC system 102 provides the configuration information 214 to a deployment system 222. The deployment system 222, in turn, uses the configuration information 214 to install code on the computing platform 206 that will implement the new functionality 208. In some cases, the deployment system 222 can perform this task via application programming interfaces (APIs) and protocols defined by the provider of the computing platform 206. For example, the deployment system 222 can call appropriate APIs to create databases, services, etc. required by the configuration information 214. Other implementations can omit one or more operations shown in FIG. 2, such as the operation of the feature-reconciling component 202. Alternatively, or in addition, other implementations can add one or more operations not shown in FIG. 2.

Although FIGS. 1 and 2 illustrate a pipeline of operations as a single integrated process, note that two or more entities may implement different parts of the pipeline. In one case, for example, a developer may use the functionality shown in FIGS. 1 and 2 to produce the configuration information 214, while a second entity, different from the developer, may interact with the deployment system 222 to actually install the new code on the computing platform 206. Alternatively, a single entity may perform all of the operations shown in FIGS. 1 and 2.

Figures 15, 16:
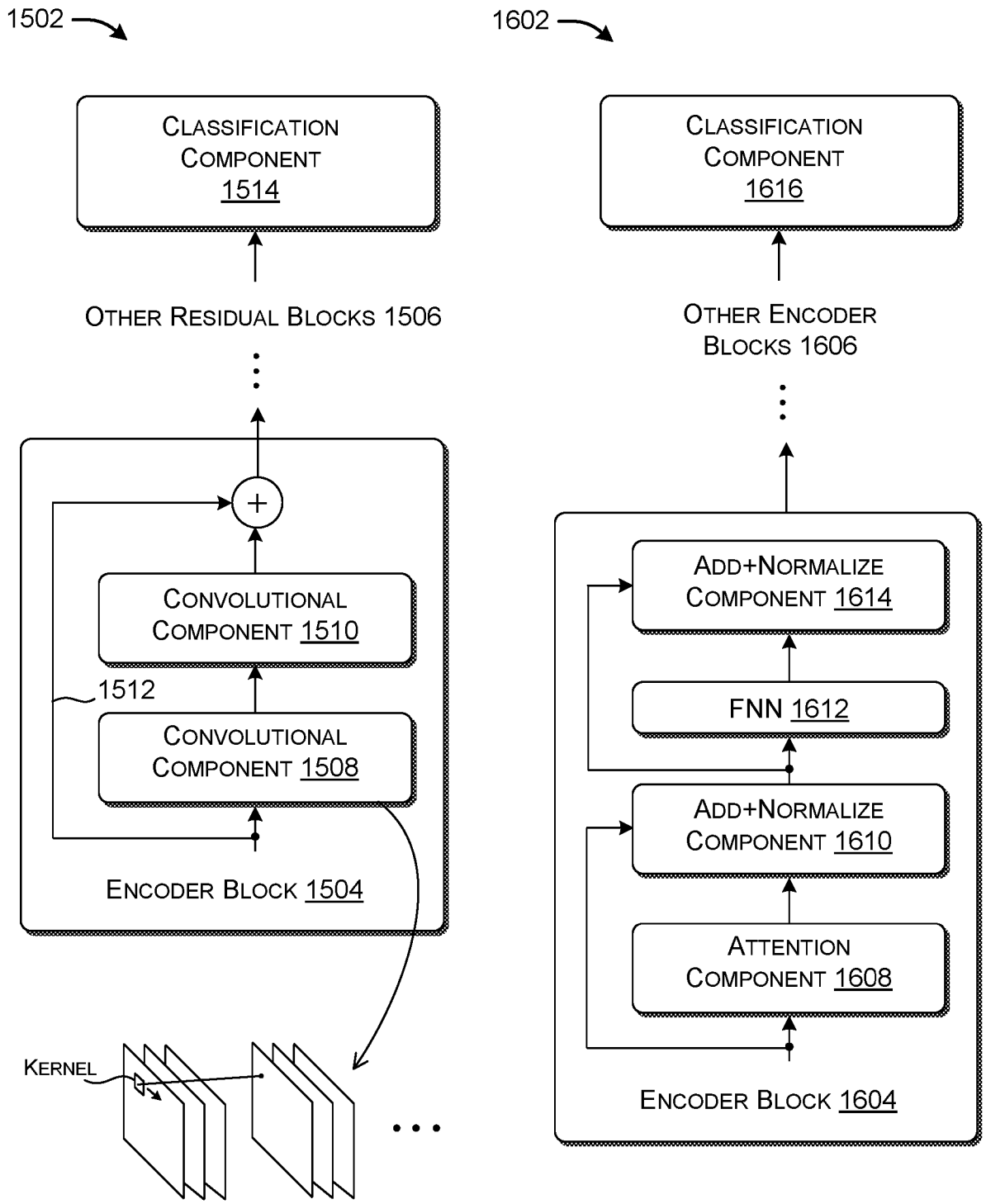
FIG. 15 shows an illustrative and non-limiting model that can be used to implement aspects of the IAC system of FIG. 1. The model shown in this figure uses convolutional neural network technology.
FIG. 16 shows another illustrative and non-limiting machine-trained model that can be used to implement aspects of the IAC system of FIG. 1. The model shown in this figure uses a transformer-based architecture.

As will be described in greater detail below, the IAC system 102 can use machine-trained logic to implement any of the functions described above. For instance, the service-recognizing component 108 can use a first machine-trained model to identify the services 110 in the input image 104. The flow-recognizing component 112 can use a second machine-trained model to identify connectors and relations in the input image 104. The attribute-determining component 118 can apply a third machine-trained model to identify the attributes 120. The graph-supplementing component 124 can apply a fourth machine-trained model to generate the modified graph data structure 126, and so on. In other cases, the functions performed by two or more components shown in FIGS. 1 and 2 can be implemented by a single machine-trained model. In other cases, a single end-to-end machine-trained model can perform all of the functions shown in FIGS. 1 and 2. FIGS. 15 and 16 describe two non-limiting examples of machine-trained logic that can perform aspects of the functions described in FIGS. 1 and 2.

The IAC system 102 has a technical benefit of markedly decreasing the amount of user interface actions and decisions that a user needs to make to deploy a target computing environment. The user is only asked to supply the image 104 of the target architecture, optionally along with a small number of configuration parameters (e.g., three such parameters in one example). This user experience may be particularly appealing to novice developers, who may not have the time and/or aptitude to create a target computing environment from scratch, or may not have the patience to engage in an extended dialogue with an automated agent. Further, the IAC system 102 produces a target computing environment that incorporates design principles adopted by many other developers as good coding practices, even though these principles may not be exhibited in the input image 104 itself. This reduces the risk that the new functionality 208 deployed on the computing platform 206 will contain errors and/or pose security flaws or other vulnerabilities.

More precisely, note that the architecture shown in the input image 104 is the foundation or seed from which the IAC system 102 determines the target computing environment 100. However, the goal of the IAC system 102 is not to narrowly duplicate the architecture shown in the image 104, but to deduce an entire technical ecosystem associated with a computing solution, including the solution's individual resources, architecture, network framework, and definitional framework. The IAC system 102 performs this task by using the architecture shown in the image as a search key to search empirical datasets, with the goal of fleshing out a complete technical environment associated with a computing solution. In other words, the IAC system 102 infers a complete technical solution space based on seed information found in the image 104. This manner of operation expedites the design of a complete technical solution, reduces burden on the developer, and improves the performance, reliability, monitoring capability, and security of the technical solution.

FIG. 3 shows one implementation of the service-recognizing component 108, the purpose of which is to recognize the services of the input image 104. The service-recognizing component 108 can use one or more subcomponents to perform its analysis, such as a text-analyzing component 302 and an image-analyzing component 304. The text-analyzing component 302 can use any optical character recognition (OCR) engine to recognize alphanumeric information expressed in the input image 104. One non-limiting type of OCR engine generates image features that represent the text content in the input image 104. The OCR engine can then use any type of processing logic (such as any type of neural network, or a machine-trained hidden Markov model (HMNI)) to convert the image features that represent the text features into recognized text. In a next stage, the text-analyzing component 302 can use any machine-trained logic and/or rules-based logic to classify icons present in the input image based on the recognized text produced by the OCR engine. For example, the text-analyzing component 302 can use machine-trained logic to convert an instance of recognized text into text-based features, and can then map the text-based features into a classification result.

The image-analyzing component 304 can use any end-to-end machine-trained model(s) to classify icons that appear in the input image 104. These models operate by generating image features that represent the pixel-level content of the input image 104, and then mapping the image features into classification results without first converting the pixels into recognized text using the OCR engine. The image-analyzing component 304 also identifies a bounding box that encloses each detected service.

The text-analyzing component 302 classifies each candidate icon with a level of confidence specified by a first confidence score. The image-analyzing component 304 classifies each candidate icon with a level of confidence specified by a second confidence score. The service-recognizing component 108 can use predetermined rules and/or machine-trained logic to consolidate the conclusions made by the text-analyzing component 302 and the image-analyzing component 304. For instance, if the text-analyzing component 302 and image-analyzing component 304 reach the same conclusion as to the identity of a candidate icon, then the service-recognizing component 108 can conclude with a high degree of confidence that the identified icon is likely present in the input image 104. In those cases in which the conclusion of the text-analyzing component 302 differs from the conclusion of the image-analyzing component 304, the service-recognizing component 108 can accept whatever conclusion has the highest confidence, presuming that this winning conclusion satisfies a predetermined threshold value. The service-recognizing component 108 can assign no classification or can assign a predetermined default classification to an icon when the identity of the icon cannot be established using the above processing operations.

Different providers of cloud computing service may represent their services using different provider-specific set of icons. The service-recognizing component 108 optionally also includes a separate text-based and/or image-based model that determines the likely provider associated with the input image 104. This provider-detection model can operate on the initial input image 104 and/or can operate on the output results generated by the above-described text-based and/or image-based processing. For example, the provider-detection model can be implemented as a neural network classifier that operates on logits produced by the above-described text-based processing and/or image-based processing, or can operate beside the above-described text-based processing and/or image-based processing.

FIG. 4 shows one implementation of the flow-recognizing component 112, the purpose of which is to detect and validate connectors and relations present in the input image 104. A connector-detecting component 402 classifies the connectors in the input image 104. The connector-detecting component 402 can use any combination of the types of text-based logic and/or the image-based logic used by the service-recognizing component 108, but here applied to the classification of connectors rather than icons. The connector-detecting component 402 can also perform the same kind of reconciliation described above between potentially conflicting conclusions reached by the text-based logic and image-based logic.

The connector-detecting component 402 generates output results that identify a bounding box that encompasses each potential candidate connector. The connector-detecting component 402 also classifies the type and directionality of each candidate connector. Different types of connectors convey different information about the relations between two services. For example, a containment-type connector that points from a first service to a second service indicates that the second service operates within the first service. A containment-type connection is assigned the label "In" in the original graph data structure 116. A data-type connector that points from the first service to the second service indicates that the first service transfers data to the second service. A data-type connector represented by a double-headed arrow between the first service and the second service indicates that the first and second services exchange data with each other. Data-type connections are represented in the original graph data structure 116 using the labels "To" (for the unidirectional flow of data from one service to another) and "ToFrom" (for the bidirectional flow of data between two services). Other implementations can introduce the use of other connector types. In general, a source service (to be associated with a source node in the original graph data structure 116) refers to the source of data, and a target service (to be associated with a target node in the original graph data structure 116) represents the recipient of the data.

A relationship-building component 404 builds relations based on the output results of the connection-detecting component 402. Each candidate relation has the generic form service1-connector-service2, meaning that a connector connects a first service (service1) to a second service (service2). More specifically, the relationship-building component 404 establishes a candidate service1-connector-service2 relationship when it determines that the service1's bounding box is within a prescribed distance of the connector's bounding box, and that the service2's bounding box is also within the prescribed distance of the connector's bounding box.

The relationship-building component 404 can perform a second-level validation of a candidate relation by determining whether this type of relation is found in the relation validation information provided in the data store 114. FIG. 5 shows a small sample 502 of the validated relationships in the data store 114. For instance, a first relationship indicates that a data-type connection pointing from an App service to a SQL database, for a target type "data," defines a valid relation. The connector-detecting component 402 will conclude that a candidate connector is potentially invalid if there is no counterpart entity described in the data store 114.

The relationship-building component 404 can also take corrective action upon determining that a candidate relation is not present in the data store 114. As a first attempt at correction, the relation-building component 404 will reverse the direction of the connector that has been detected, e.g., such that instead of indicating the flow of data from a first service to a second service, the connector is changed to indicate the flow of data from the second service to the first service. The relationship-building component 404 can consider the modified relation as validated if it is described in the data store 114.

The relation-building component 404 can initiate a second attempt at correction upon failure of the first attempt. In the second attempt, the relationship-building component 404 can substitute an originally-detected target service with another target service that is within a same class as the originally-detected target service, and where the resultant relationship is described in the data store 114. If there are plural alternative target services in the class from which to choose, the relationship-building component 404 can select the target service having the lowest financial cost, and/or the target service that most effectively meets one or more other metrics (e.g., pertaining to performance, resource consumption, or other metric). The relationship-building component 404 can replace the source service with a same-class source service if replacing the target service does not result in any valid connections. The relationship-building component 404 can also attempt to replace both the source service and the target service with respective same-class services. If all of these proposals fail to produce a valid relationship, the flow-recognizing component 112 can label the relationship as undefined. The above-described processing is one way in which the IAC system 102 can correct errors in the input image 104.

Figure 6:
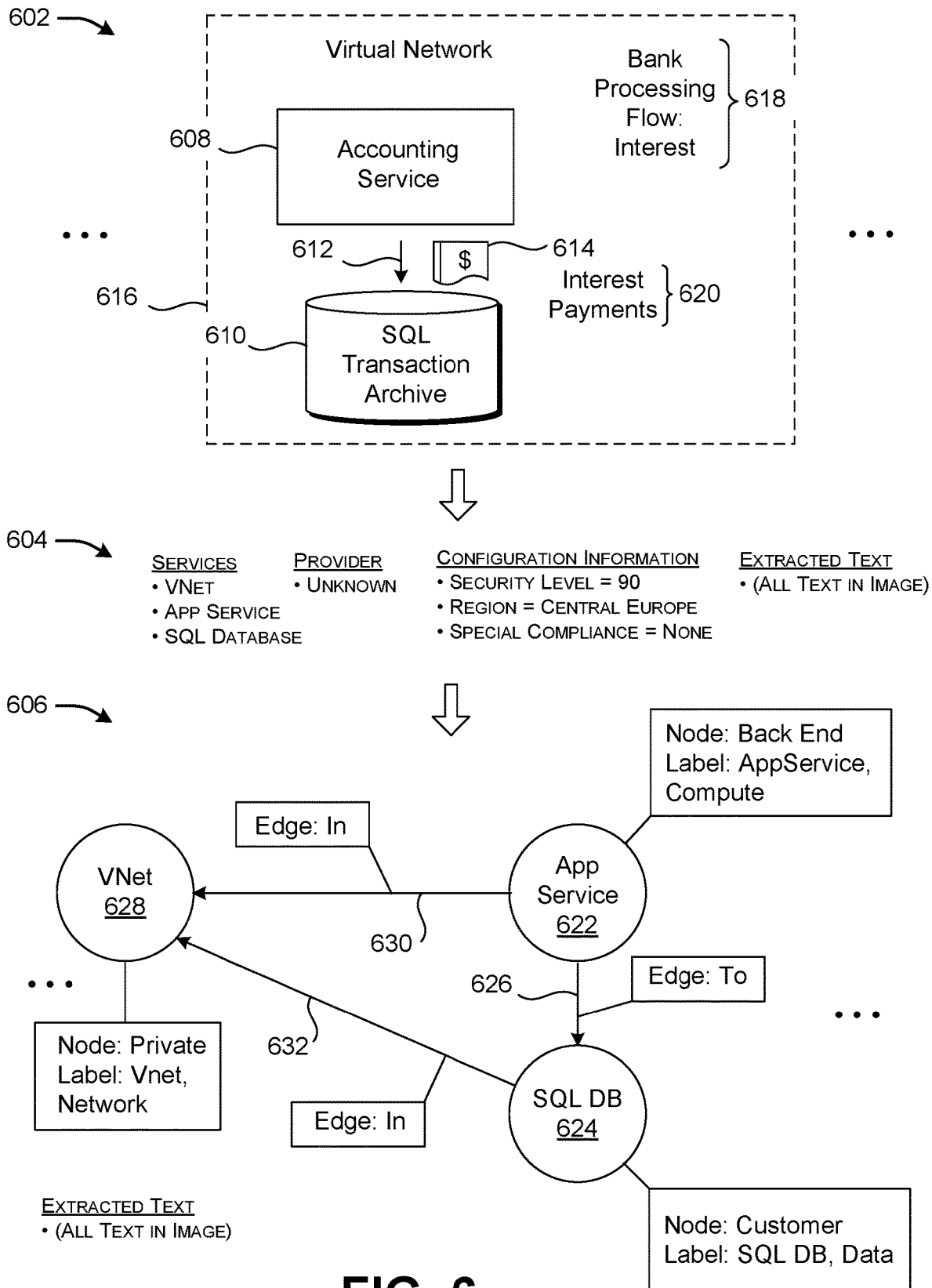
FIG. 6 shows an illustrative transformation of a simplified image into an original graph data structure, as performed by the IAC system of FIG. 1.

FIG. 6 shows a simplified example of how the service-recognizing component 108 transforms an input image 602 into intermediary results 604, including detected services and other output results. FIG. 6 further shows how the flow-recognizing component 112 maps the intermediary results 604 into an original graph data structure 606. The image 602 shows a box 608 labeled "Accounting Service" coupled to a database symbol 610 labeled "SQL Transaction Archive" via an arrow 612 annotated with an icon 614 representing some type of financial-related document (as indicated by the dollar sign used by the icon 614). All of this image content is enclosed in dashed box 616 that is given the label "Virtual Network." Finally, the image 602 includes a title 618 that reads "Bank Processing Flow: Interest," and a label 620 in proximity to the icon 614 that reads "Interest Payments." In other cases, an input image may provide region-related information, IP range information, domain name information, and so on. In actual practice, an input image will generally be more complex than the input image 602 shown in FIG. 1.

The intermediary results 604 indicate that the service-recognizing component 108 recognizes three services in the input image 602, including an application service (App Service) associated with the box 608 labeled "Accounting Service," an SQL database associated with the database symbol 610, and a virtual network (VNet) associated with the virtual network 616. Assume that the service-recognizing component 108 is unable to classify the provider associated with the services depicted in the input image 602 with sufficient confidence. Finally, the service-recognizing component 108 extracts and preserves all the text that appears in the input image, including the title 618 and the label 620. The user may independently manually provide input information that specifies that the security level associated with the target computing environment 100 being designed is 90 (where 100 reflects the most secure score), and that specifies that the target computing environment 100 will be deployed in Central Europe.

The flow-recognizing component 112 uses the intermediary results 604 to form candidate relationships (e.g., given of the form servcie1-connector-servcie2) and then validate the candidate relationships. The original graph data structure 606 includes a source node 622 that represents the Accounting Service coupled to a target node 624 that represents the SQL Transaction Archive via an edge 626 that represents the arrow 612. The source node 622, target node 624, and edge 626 are related to a third node 628 that represents the virtual network 616 via respective edges (630, 632). These edges (630, 632) are containment-type connectors, indicating that the source node 622, target node 624, and edge 626 operate "inside" the third node 628. The IAC system 102 can also attach additional label information to any of the above-identified nodes and edges that describes properties detected and/or inferred from the input image 602 and/or intermediary results 604. FIG. 6 shows the label information in boxes that are coupled to respective graph features to which they pertain.

Figure 7:
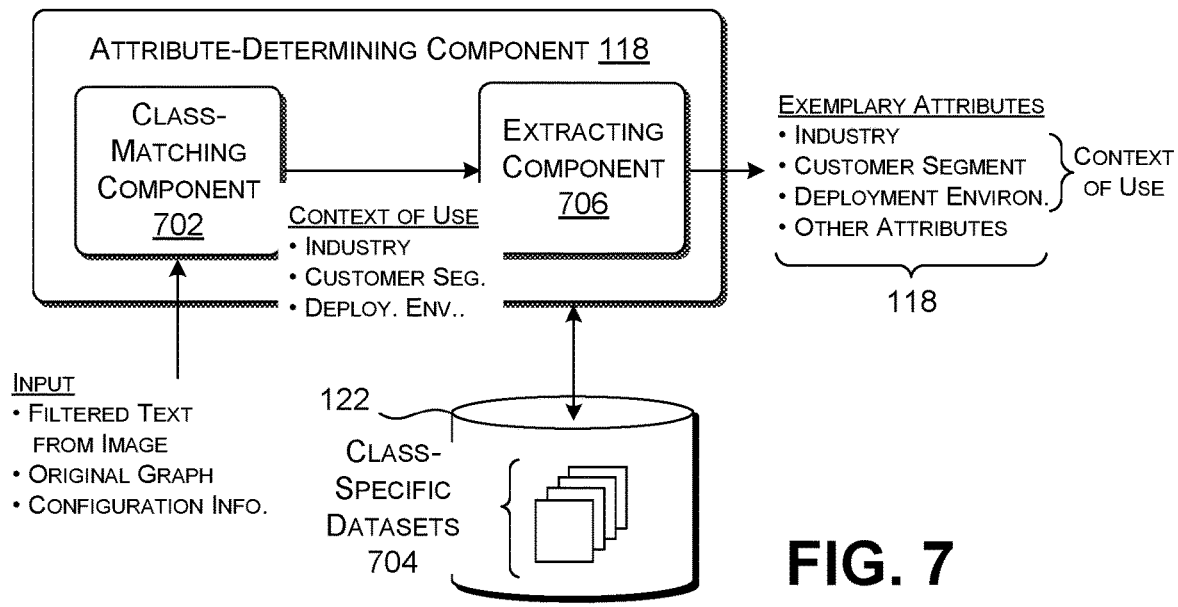
FIG. 7 shows one implementation of an attribute-determining component, which is another part of the IAC system of FIG. 1.

FIG. 7 shows one implementation of the attribute-determining component 118, the purpose of which is to determine the set of attributes 120 based on the original graph data structure 116. The attribute-determining component 118 can also base its decisions on text extracted from the image 104 by the service-recognizing component 108 (such as the title 618 and the label 620 of FIG. 6), and the input information specified by the user.

The attribute-determining component 118 can be implemented in different ways. In a first implementation, a class-matching component 702 performs an initial task of identifying a class-specific dataset that is relevant to the kind of computing system depicted in the original graph data structure 116, selected from a corpus of class-specific datasets 704 in the data store 114. For instance, the matching component 702 can construct a text-based query based on the text extracted from the image 104, optionally filtered to exclude the names given to the services themselves. The class-matching component 702 can then select the dataset having text that most closely matches the text query. The class-matching component 702 can use any type of machine-trained model and/or rules-based system to perform the above-described matching. For instance, in one merely illustrative implementation, the class-matching component 702 can use a neural network or other natural language processing (NLP) engine to convert a text-based query into a query vector in a low-dimensional vector space. The vector represents the semantic content of the text-based query. The class-matching component 702 can then select the dataset having a counterpart dataset vector that is closest to the query vector in the vector space, e.g., which can be assessed based on any distance metric, such a cosine similarity. A backend process (described below) performs the offline task of mapping text associated with each dataset into a corresponding dataset vector.

In addition, or alternatively, the class-matching component 702 can construct a graph-based query based on the content of the original graph data structure 116. The class-matching component 702 can then select the dataset having a representative graph data structure that most closely matches the graph-based query. The class-matching component 702 can use any technique to perform its graph-based search. For example, the class-matching component 702 can assess the similarity between two graphs by determining the number of matching nodes and edges, and/or the number of non-matching nodes and/or edges. Alternatively, or in addition, the class-matching component 702 can use an image-based search by generating a query image vector that represents an image of the original graph data structure 116. The class-matching component 702 can then select the dataset having a counterpart dataset vector that is closest to the query vector in the vector space, e.g., which can be assessed based on any distance metric, such as cosine similarity. The backend process produces each dataset vector in an offline process by mapping the dataset's representative graph data structure into a corresponding dataset vector. Further, the class-matching component 702 can use any approximate nearest neighbor (ANN) technique to efficiently explore a search space of candidate dataset vectors.

The text-based processing and the image-based processing reach separate conclusions with respective levels of confidence associated therewith. The class-matching-component 702 can use any environment-specific rules or logic to reconcile potentially conflicting conclusions. For example, in the case of a conflict, the class-matching component 702 can select whatever output result has the highest confidence, providing that this result satisfies a predetermined threshold. In those cases in which the attribute-determining component 118 cannot determine the class of the original graph data structure 116 with sufficient confidence, it can assign the following default classification: industry=cross-industry, organizational type=small-to-medium business, and deployment environment=production.

In some implementations, each dataset is associated with a particular context in which the target computing environment 100 is likely to be used. That is, each dataset is associated with a particular type of industry, a particular type of organization, and a particular type of deployment environment. With respect to the simplified example of FIG. 6, the class-matching component 702 may determine that the architecture shown in the input image 102 most likely pertains to a production system used by an enterprise in the field of finance. In part, the class-matching component 702 can draw this conclusion based on telltale finance-related keywords and symbols that appear in the image 602, such as "Bank," "interest," "$," and "payments." Thus, after this first stage of processing, the class-matching component 702 will have established at least three attributes: a first attribute that identifies the type of industry; a second attribute that identifies the type of organization; and a third attribute that identifies the deployment environment. In the implementations described above, the attribute-determining component 118 can use a single machine-trained model or algorithm to map the original graph data structure 116 and accompanying text into an indication of the three context-related attributes. In other implementations, the attribute-determining component 118 can use separate machine-trained models or algorithms to respectively generate the three context-related attributes, e.g., by using a first model or algorithm to determine the industry type, a second model or algorithm to determine the organization type, and a third model or algorithm to determine the deployment environment type.

An extracting component 706 can extract additional attributes from the dataset identified by the class-matching component 702. For instance, the extracting component 706 can extract one or more size-related parameters from the matching dataset. One such size-related attribute may describe the average size of data items processed by the target computing environment 100 (which can be quantized into levels of small, medium, or big). In addition, or alternatively, the extracting component 706 can extract an attribute that describes the ingestion speed of the target computing environment 100 (which can be quantized into levels of slow, medium, and high). Data ingestion speed refers to the rate of data transfer at identified points of interest in the target computing environment 100.

Figure 8:
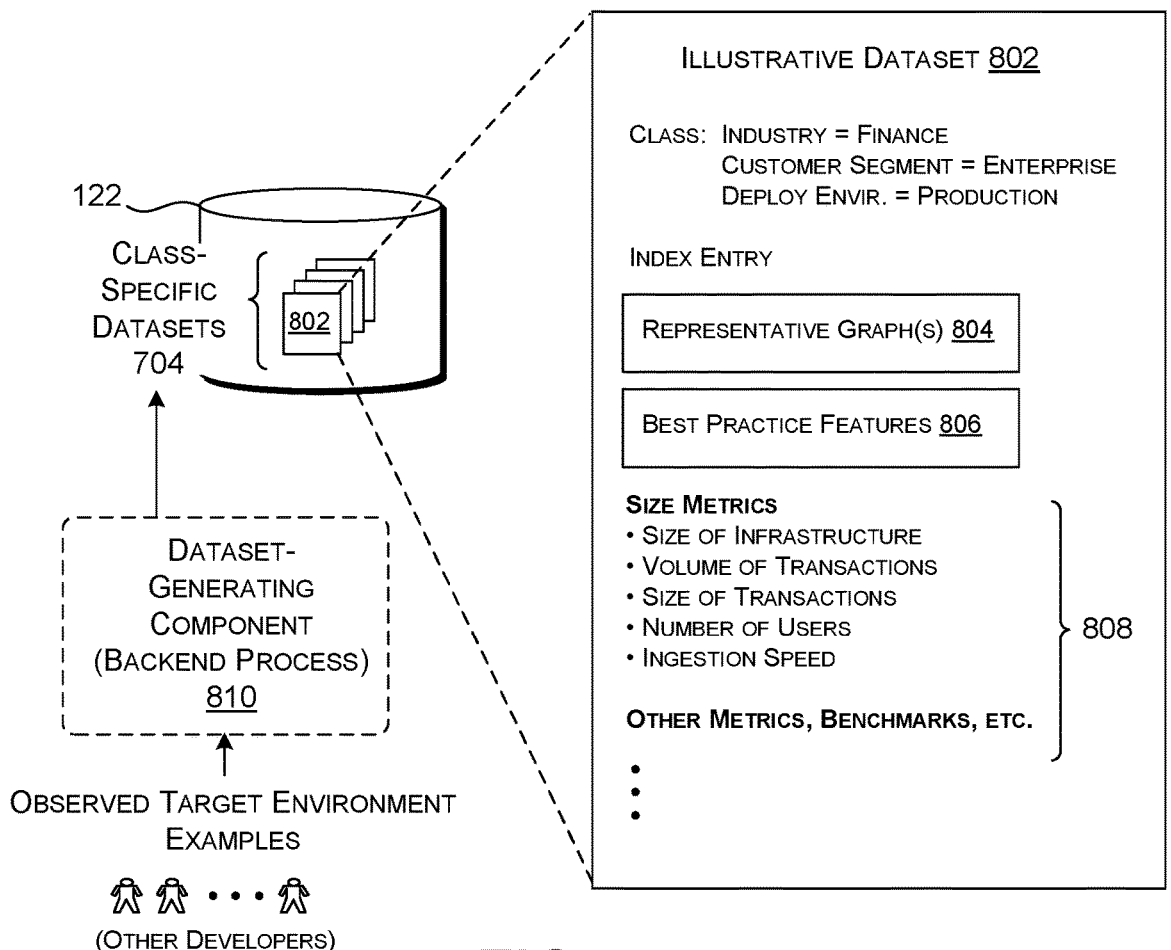
FIG. 8 shows an example of a dataset to which the attribute-determining component of FIG. 7 has access.

FIG. 8 illustrates a non-limiting example of one such dataset 802 in the corpus of datasets 704. Again, this dataset 802 is associated with a particular class of target computing environments associated with a particular kind of industry, a particular kind of organization, and a particular kind of deployment environment. The dataset 802 may provide indexing information by which the class-matching component 702 can locate the dataset 802. The indexing information can specifically include any combination of text features, image features, etc.

The dataset 802 includes plural parts or sections. One part 804 of the dataset 802 provides one or more representative graph data structures associated with the dataset's class. The class-matching component 702 can perform a graph-based comparison by comparing the original graph data structure 116 with the dataset graph data structure(s) provided in this part 804 of the dataset 802. Another part 806 of the dataset 802 identifies common features of the target computing environments, with respect to one or more aspects of performance (e.g., security, reliability, monitoring capability, or other aspect). For example, this part 806 may indicate that this class of target computing environments commonly use a particular security service, particularly in certain parts of Europe. Another part 808 of the dataset 802 identifies various metrics, norms, benchmarks, etc. associated with the dataset 802. The extracting component 802 can extract any attribute from any part of the dataset 802.

Other implementations of the IAC system 102 can include additional kinds of information in datasets, compared to the kinds of information described above. In addition, or alternatively, other implementations can omit one or more types of information described above. Further, other implementations of the IAC system 102 can organize attributes in different ways compared to that described above. For example, other implementations can define classes using different criteria than described above, including classes that are broader than the class described above, and/or classes that have a smaller scope than the class described above. Further, other implementations can use various strategies for organizing attribute information, e.g., by storing attribute information in a hierarchy of classes. Here, a child class may inherit the attribute information specified in a parent class.

A dataset-generating component 810 can create the datasets 704 and can maintain them on a continuous or periodic basis. Consider the case in which a particular dataset under consideration encompasses N actual instances of target computing environments. The dataset-generating component 810 can choose one or more of these instances that most effectively represents the class, e.g., for use in populating the part 804 and/or the part 806 of the dataset 802. Further assume that each target computing environment in the class is defined with respect to one or more attribute values. For instance, one such attribute value may define a security score of the target computing environment 100, indicating the importance that the designer has placed on security. For each such attribute, the dataset-generating component 810 generates a distribution of attribute values across the class. The dataset-generating component 810 then selects a particular attribute value to represent this distribution, such as the attribute value associated with the 50$^{th}$ percentile of the distribution (which corresponds to the most common attribute value), or the average attribute value, or the maximum attribute value, or the minimum attribute value, or any other attribute value. The dataset-generating component 810 then adds the selected attribute value to the part 808 of the dataset 802.

Another implementation of the attribute-determining component 118 can generate a collection of features that describe the original graph data structure 606 and the extracted text associated therewith. The attribute-determining component 118 can then map the features to the kinds of attributes described above using a machine-trained model, examples of which will be set forth below. This implementation can forego the use of the search and extraction operations described above, and/or can supplement this search and extraction operation. Instead of a search and extraction operation, this implementation synthesizes the attributes from the input information. The machine-trained model can be trained in an offline training process by learning the nexus between different target computing environments and their respective attributes. Thus, although this implementation can be said to produce synthetic attributes, these attributes are nonetheless empirically grounded because they are produced by a machine-trained model that has been trained on an empirical dataset.

Still other implementations of the attribute-determining component 118 can be used; the above two versions of the attribute-determining component 118 are to be understood as illustrative and non-limiting. Further, any further reference to a dataset is to be understood as representing a single data record or information expressed across two or more data records.

Figures 9, 10, 11:
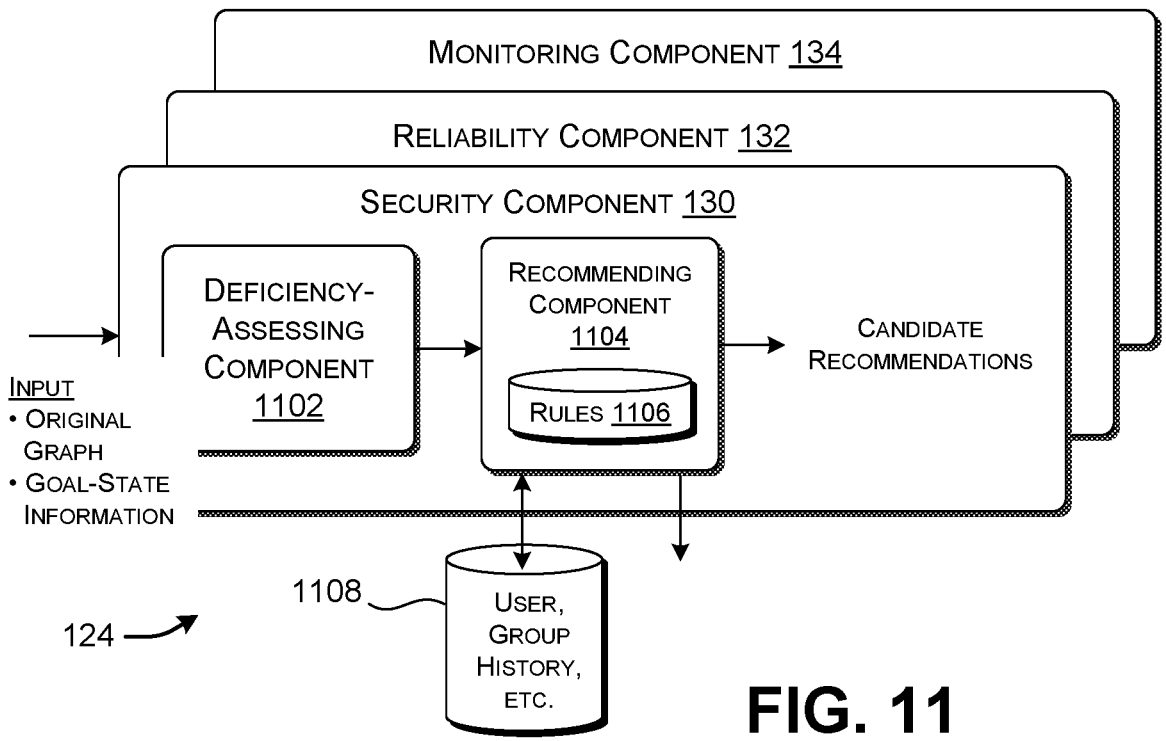
FIGS. 9 and 10 show examples of context-specific attributes accessible to the attribute-determining component of FIG. 7. The context-specific attributes are derived from other target computing environments.
FIG. 11 shows one implementation of a graph-supplementing component, which is another part of the IAC system of FIG. 1.

FIGS. 9 and 10 provide one example of the operation of the class-matching component 702 and the extracting component 706. Assume that the class-matching component 702 determines that the input image 602 and its original graph data structure 606 (of FIG. 6) correspond to the class defined by: industry=finance; type of organization (customer segment)=enterprise; and deployment environment= production. The extracting component 706 can use these class-related attributes as a key to determine, from a lookup table 902 of FIG. 9, that the security score associated with this class is 90. The extracting component 706 can use the same class-related attributes to determine, from a lookup table 1002 of FIG. 10, that a disaster recovery (DR) score for this class is 90, and a high reliability (HR) score for this class is 80. This is an example in which the information associated with a dataset is distributed over plural lookup tables, but the same information can be consolidated into a single class-specific record in the manner shown in FIG. 8. The concept of a dataset should be understood as a collection of data items provided in the data store 122, regardless of whether the data items are expressed in a single data structure or distributed across plural data structures.

FIG. 11 shows one implementation of the graph-supplementing component 124, the purpose of which is to modify the original graph data structure 116, to produce the modified graph data structure 126. As previously explained, the graph-supplementing component 124 adds information to the original graph data structure 116 that cannot necessarily be gleaned from the input image 104 by itself. Instead, the graph-supplementing component 124 extracts additional insight regarding the architecture described in the input image 104 from the attributes 120 generated by the attribute-determining component 118. The attribute-determining component 118, in turn, can generate these attributes in different ways summarized above, such as by extracting them from one or more pre-generated datasets and/or synthesizing the attributes using a machine-trained model.

As further explained above, the graph-supplementing component 124 can include plural sub-components that make candidate recommendations to modify the original graph data structure 116 with respect to different respective performance objectives. A security component 130 generates recommendations intended to improve the level of security provided by the target computing environment 100 described by the original graph data structure 116. For example, the security component 130 can recommend the use of new services and/or connectors that implement firewalls, virtual networks, key vault services, malware protection services, containment strategies, and so on. The specific logic governing the operation of the security component 130 is environment-specific in nature and fully extensible, allowing new rules to be added at any time. In one merely illustrative implementation, the security component 130 will recommend that any IP range specified in the input image 104 is validated and secured in the target computing environment 100. The security component 130 will recommend that non-public cloud resources are secured behind private virtual networks. The security component 130 will recommend that password-based access mechanisms specified in the input image 104 be changed to password-less managed identity services, and so on.

A reliability component 132 generates recommendations intended to enhance the reliability of the target computing environment 100 by recommending the use of various services and connections, such as a load balancer, traffic manager, front door, and/or application gateway. For example, to promote high availability, the reliability component 132 can recommend one or more modifications to divert traffic among duplicated resources. To promote site recovery, the reliability component 132 can recommend added functionality that performs periodic backups in multiple regions, based on norms extracted from the applicable dataset. The reliability component 132 can also include logic that takes account for regional regulatory constraints that affect the use of different reliability solutions.

The monitoring component 134 generates recommendations with the aim of improving the monitoring ability of the target computing environment 100. For example, the monitoring component 134 can recommend the use of services and/or connectors that perform tracking, logging, alerting, troubleshooting (diagnostics), etc. In some implementations, the monitoring component 134 specifically uses the class attributes as a key to access a prototype graph data structure that provides recommended monitoring-related functionality. The monitoring component 134 can use the same key to access a table that provides recommended parameter settings, e.g., governing recommended data log sizes, retention periods, data speeds, and/or other parameter setting.

Other implementations of the graph-supplementing component 124 can include additional sub-components and/or can omit one or more of the particular sub-components described above. Further, the graph-supplementing component 124 adopts an extensible design that allows it to be customized at any time to address new needs.

FIG. 11 also shows one non-limiting implementation of the security component 130. Although not shown, the reliability component 132 and the monitoring component 134 can include the same kind of functionality as the security component 130, but configured to serve their respective performance objectives.

A deficiency-assessing component 1102 can compare the original graph data structure 116 with any goal-state information. In some implementations, the goal-state information describes a target archetype graph data structure that is similar to the original graph data structure 116, but which includes security-related features that are considered beneficial (wherein the beneficial nature of these features can be inferred based on collected evidence of the use of these features in other target computing environments). The goal-state information may originate from the matching dataset, e.g., as extracted from part 804 of the dataset 802 shown in FIG. 8. Further, the goal-state information may include one or more attributes that define a goal-state security level, e.g., as expressed as a security score ranging from 0 to 100, and/or any other attribute(s) that serve as target objectives.

The deficiency-assessing component 1102 can identify all of the ways in which the original graph data structure 116 fails to match the goal-state information. To perform this task, the deficiency-assessing component 1102 can identify the nodes and edges that are described in the goal-state information that do not have counterpart nodes and edges that appear in the original graph data structure 116. The deficiency-assessing component 1102 can also perform the same operation in reverse, e.g., by determining features in the original graph data structure 116 that are not found in the goal-state information. Alternatively, or in addition the deficiency-assessment component 1102 can use a machine-trained model that accepts feature information that describes the original graph data structure 116 and the goal-state information. The machine-trained model can map this feature information into output results that identify the deficiencies of the original graph data structure 116 vis-à-vis the goal-state information. The output results generated by the deficiency-assessing component 1102 will henceforth be referred to as deficiency information.

A recommending component 1104 provides zero, one, or more candidate recommendations based on the deficiency information generated by the deficiency-assessing component 1102. The recommending component 1104, like the deficiency-assessing component 1102, can be implemented in different ways. In one implementation, the recommending component 1104 can use a rule-based engine to map the deficiency information to the recommendations, e.g., based on explicit handcrafted rules specified in a data store 1106. In other implementation, the recommending component 1104 can use a machine-trained model to perform this mapping based on logic specified in the data store 1106. The security component 130 can validate all of its recommendations in various ways, e.g., by determining whether the relations used to implement the recommendations are present in the relation validation information in the data store 114.

In some implementations, the recommending component 1104 can also base it recommendations on history information specified in a data store 1108. For instance, the history information can identify common design choices made by the developer in previous sessions with respect to the class of target computing environments under consideration. In addition, or alternatively, the history information can identify common design choices made by a group of developers with respect to the class of target computing environments under consideration. This group can be identified with respect to any factor(s), such as organizational affiliation, expertise affiliation, regional affiliation with respect infrastructure deployment, regional affiliation with respect to developer locations, and so on. The recommending component 1104 can use machine-trained logic and/or handcrafted rules to incorporate the history information into its recommendation analysis. For example, if a developer has frequently configured settings for a high security score and frequently used a collection of cloud services, the security component 130 will prioritize future use of the same cloud services. In another example, the history information may indicate that developers in Central Europe frequently use particular security features in their network designs. Accordingly, the security component 130 will favor the future use of the same features for these developers.

FIG. 12 shows a sample 1202 of illustrative rules accessible to one implementation of a security component 130. The first rule indicates that, in one particular class, it is appropriate to add a firewall to an original graph data structure 116 when the original graph data structure 116 lacks this feature. A second rule indicates that, in one particular class, it is appropriate to add an application gateway to an application service in the original graph data structure 116 when the original graph data structure 116 omits a gateway for Internet-facing applications.

FIG. 13 shows a sample recommendation 1302 generated by the security component 130. The recommendation 1302 specifies the introduction of a key vault for use by an application service, and modification of the original graph data structure 116 to incorporate a new target node and edge associated with the use of the key vault. The sample recommendation 1302 may also optionally provide one or more scores that are associated with the recommendation. These scores specify weight values that convey an extent to which the recommendation satisfies different design goals, such as a security-related goal, a reliability-related goal, a monitoring-related goal, a cost-related goal, a performance-related goal, and so on. For instance, a high weight value for security conveys that the recommendation is highly compliant with security-related best practices. A high weight value for cost indicates that the recommendation will incur a relatively high financial cost. Generally, the types of rules appropriate to different environments will depend on the nature of those respective environments.

The selection and sizing (S&S) component 136 (shown in FIG. 1) performs at least two main functions. The S&S component 136 can implement these functions as rules in a data store, machine-trained logic, etc., or any combination thereof. The S&S component 136 performs its functions based on the original graph data structure 116, the attributes 120 (including the context-related attributes, data-sizing attribute(s), data ingestion attribute(s), etc.), one or more industry datasets, the user input information 106, the initial recommendations 128, etc.

As a first function, the S&S component 136 selects zero, one or more recommendations from the initial recommendations 128. In one non-limiting approach, the S&S component 136 performs this task by first accepting all recommendations that meet regulatory requirements for the industry inferred by the attribute-determining component 118. The S&S component 136 can then select from among the remaining recommendations based on various considerations, such as threshold values explicitly set by the developer, and/or industry default threshold values. For instance, assume that a developer specifies a cost threshold of 50 in the user input information 106 or elsewhere. The S&S component 136 can use this threshold as a guideline to omit one or more recommendations that have high cost (where the cost of a recommendation is specified by its cost-related weight value). In the absence of an explicit developer-specified preference for a design goal under consideration (such as security), the S&S component 136 can use an industry default threshold value to guide adoption of a recommendation (where the industry default threshold value is specified in the applicable dataset identified by the attribute-determining component 118). In other cases, the S&S component 136 is configured to perform various tradeoffs in selecting recommendations. For example, the S&S component 136 can decline the use of an inexpensive virtual machine because it does not satisfy performance-related requirements. In another case, the S&S component 136 can be configured to use batch processing in those cases in which both low cost and high performance are to be satisfied. To prevent undesirable outcomes, the IAC system 102 can guide the user to appropriately prioritize potentially conflicting design requirements, e.g., by prioritizing cost over performance or vice versa.

As a second function, the S&S component 136 chooses a node implementation for each node of the modified graph structure 136 that satisfies specified parameters, such as node sizing, transaction frequency, and/or ingestion speed. For example, assume that the attribute-determining component 118 infers that the deployment environment is production, and that high-frequency transactions will be required. The S&S component 136 will choose a node implementation that will satisfy these requirements. Such a node implementation may consume more resources compared to, for example, a development-stage system that does not require high-frequency transactions. The S&S component 136 also enables auto-scaling if this capability is supported by the node under consideration. The S&S component 136 records its sizing-related selections in the modified graph data structure 126 as metadata annotated to respective nodes.

FIG. 14 shows an illustrative organization of the existing functionality 204 in the computing platform 206. In this merely illustrative case, the existing functionality 204 is organized into plural domains, such as code domain A 1402, code domain B 1404, and code domain C 1406. Further assume that the IAC system 102 adds the new functionality 208 that it generates to the code domain C 1406 (as indicated by arrow 1408). The feature-reconciling component 202 can determine that it is appropriate to add the new functionality 208 to the code domain C 1406 upon determining that the attribute information associated with the new functionality 208 most closely matches the attribute information associated with the domain C 1406, e.g., compared to the other domains (1402, 1404). The feature-reconciling component 202 can compare instances of code (or the graph counterparts of the code) using any type of machine-trained logic and/or rules based algorithm. In other circumstances, the computing platform 206 does not host any existing functionality 204 by the developer. In that case, the IAC system 102 can deploy the new functionality 208 to the computing platform 206 without performing reconciliation.

The remainder of Section A describes two non-limiting examples of machine-trained models that can be used to implement different components of the IAC system 102 of FIG. 1. First, FIG. 15 shows an illustrative machine-trained model 1502 that uses convolutional neural network (CNN) technology. In some applications, the model 1502 operates on feature information that describes text-based information. In other applications, the model 1502 operates on feature information that describes image-based information. In still other applications, the model 1502 can operates on a combination (e.g., a concatenation) of text-based and image-based feature information.

The model 1502 itself provides a pipeline that includes plural encoder blocks (e.g., encoder blocks 1504, 1506) optionally interspersed with pooling components, not shown). FIG. 15 specifically shows the merely illustrative case in which the representative encoder block 1504 includes a pair of convolutional components (1508, 1510). FIG. 15 also shows an optional residual connection 1512 that adds input information fed to the first convolutional component 1508 to output information produced by the second convolutional component 1510.

Each convolutional component performs a convolution operation that involves moving an n×m kernel (e.g., a 3×3 kernel) across feature information supplied to the convolutional component. In the case of an input image, the feature information represents image information. In the case of an input text item, the feature information represents text information. At each position of the kernel, the encoding subcomponent generates the dot product of the kernel values with the underlying values of the feature information. The bottom of FIG. 15 represents this convolution operation in high-level form. Each pooling component (not shown) down-samples results of a preceding convolutional operation using some sampling function, such as, for example, a maximum operation that selects a maximum value within a subset of values.

A classification component 1514 maps logits produced by a last encoder block 1506 to an output classification. For instance, the classification can identify the type of service that is illustrated in the input image 104, and which is associated with a corresponding icon. In some implementations, the classification component 1514 is implemented by a feed-forward neural network of any type in combination with a Softmax component (that implements a normalized exponential function).

FIG. 16 shows a machine-trained model 1602 that uses transformer-based technology. The machine-trained model 1602 can operate on feature information that describes text-based information and/or image-based information extracted from the input image 104. The model 1602 provides a pipeline that includes plural encoder blocks (e.g., encoder blocks 1604, 1606). FIG. 16 shows a representative architecture of the first encoder block 1604. Although not shown, other encoder blocks share the same architecture as the first encoder block 1604.

The encoder block 1604 includes, in order, an attention component 1608, an add-and-normalize component 1610, a feed-forward neural network (FFN) 1612, and a second add-and-normalize component 1614. The attention component 1608 performs self-attention analysis using the following equation:

$$\text{Attention}(Q, K, V) = \text{Softmax}\left(\frac{QK^T}{\sqrt{d}}\right)V. \tag{1}$$

The attention component 1608 produces query information Q, key information K, and value information V shown in this equation by multiplying the input vectors fed to the attention component 1608 by three respective machine-trained matrices, $W^Q$, $W^K$, and $W^V$. More specifically, the attention component 1608 takes the dot product of Q with the transpose of K, and then divides the dot product by a scaling factor $\sqrt{d}$, to produce a scaled result. The symbol d represents the dimensionality of the machine-trained model 1602. The attention component 1608 takes the Softmax (normalized exponential function) of the scaled result, and then multiples the result of the Softmax operation by V, to produce attention output information. More generally stated, the attention component 1608 determines the importance of each input vector under consideration with respect to every other input vector. Background information regarding the general concept of attention is provided in Vaswani, et al., "Attention Is All You Need," in 31st Conference on Neural Information Processing Systems (NIPS 2017), 2017, 11 pages.

The add-and-normalize component 1610 includes a residual connection that combines (e.g., sums) input information fed to the attention component 1608 with the output information generated by the attention component 1608. The add-and-normalize component 1610 then performs a layer normalization operation on the output information generated by of the residual connection, e.g., by normalizing values in the output information based on the mean and standard deviation of those values. The other add-and-normalize component 1614 performs the same functions as the first-mentioned add-and-normalize component 1610. The FFN 712 transforms input information to output information using a feed-forward neural network having any number of layers.

A classification component 1616 classifies a service or connector based on information produced by the last encoder block 1606. The classification component 1616 may be implemented as a feed-forward neural network of any type followed by a Softmax component.

Figures 17, 18:
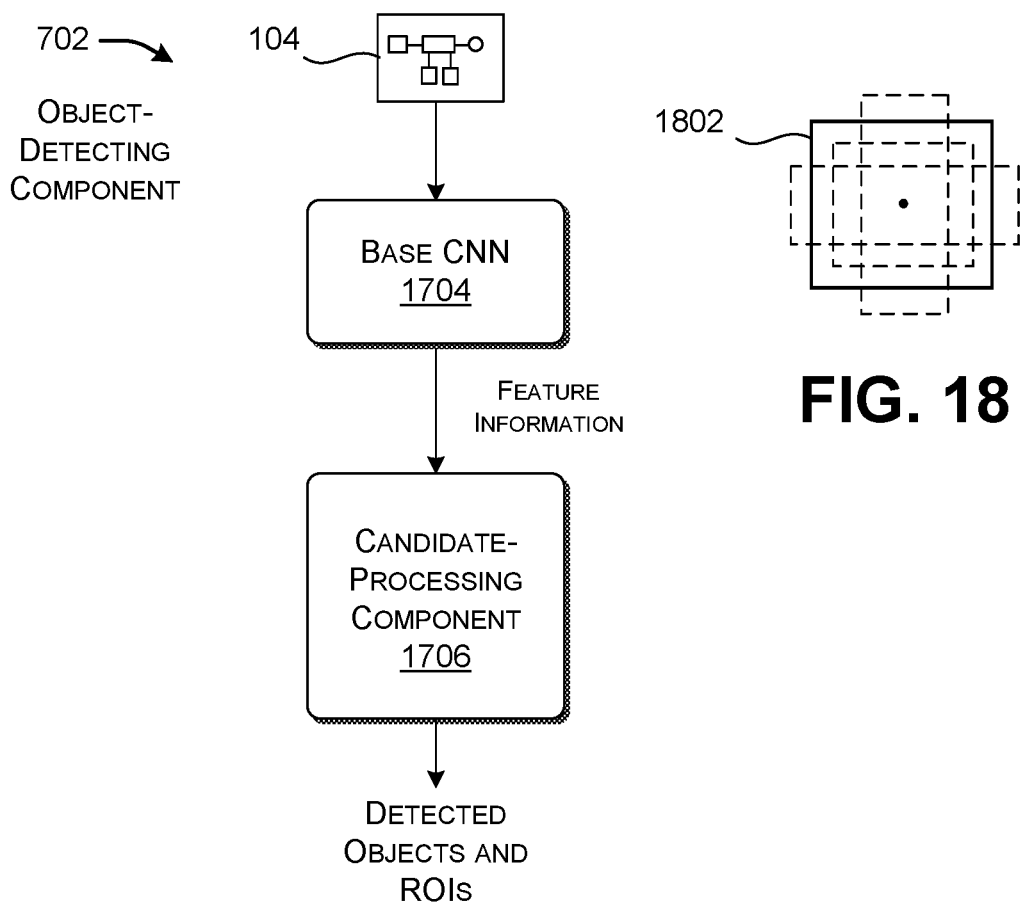
FIG. 17 shows an illustrative and non-limiting machine-trained object detector that can be used to implement aspects of the IAC system of FIG. 1.
FIG. 18 shows an example of candidate windows considered by the object detector of FIG. 17.

Advancing to FIG. 17, this figure shows one non-limiting implementation of an object-detecting component 1702 that uses CNN-based technology to detect objects in images. The object-detecting component 1702 uses a base CNN 1704 convert the input image 104 into feature information. A candidate-processing component 1706 operates on the feature information to detect objects in the image and their respective bounding boxes. In one merely illustrative technique, the candidate-processing component 1706 performs this task at plural resolution levels. This operation allows the candidate-processing component 1706 to more effectively detect objects having different sizes. The candidate-processing component 1706 performs the following illustrative processing for each cell in a grid of cells, with respect to a given resolution. The candidate-processing component 1706 identifies a plurality of candidate bounding boxes that are anchored with respect to the cell, but which have different dimensions (e.g., different aspect ratios). FIG. 18, for instance, shows a plurality of candidate bounding boxes (shown in dashed lines) that are anchored with respect to a reference position of a particular cell 1802. The candidate-processing component 1706 then determines the most likely object that appears in each candidate bounding box, if any, and the confidence score of that prediction. The candidate-processing component 1706 also determines an offset of each bounding box in relation to a reference position of the cell.

The candidate-processing component 1706 includes a subsequent consolidation phase that uses the non-maximum suppression algorithm to reduce the number of candidate bonding boxes. One iteration of the non-maximum suppression algorithm operates as follows. The candidate-processing component 1706 identifies a candidate bounding box in an initial set of candidate bounding boxes that has the highest confidence level, which is referred to herein as a "highest-confidence bounding box." The candidate-processing component 1706 adds the highest-confidence bounding box to a final set of candidate bounding boxes, and removes it from the initial set of candidate bounding boxes. The candidate-processing component 1706 then identifies all of the remaining candidate bounding boxes in the initial set that have the same classification as the highest-confidence bounding box and that intersect it by at least a prescribed amount. The candidate-processing component 1706 removes any candidate bounding box that meets this criteria. By the removal of these rival intersecting candidate bounding boxes, the candidate-processing component 1706 can be said to suppress redundant conclusions.

More generally, an object-detecting component can use many different techniques to detect objects in an image and to determine bounding boxes associated with those respective objects. General background information on the topic of machine-learned object detection can be found in: Ren, et al., "Faster R-CNN: Towards Real-Time Object Detection with Region Proposal Networks," arXiv:1506.01497v3 [cs.CV], Jan. 6, 2016, 14 pages; Liu, et al., "SSD: Single Shot MultiBox Detector," arXiv:1512.02325v5 [cs.CV], Dec. 29, 2016, 17 pages; and REDMON, et al., "You Only Look Once: Unified, Real-Time Object Detection," available at arXiv:1506.02640v5 [cs.CV], May 9, 2016, 10 pages.

Other implementations of the IAC system 102 can use any combination of the following non-exhaustive list of machine-trained models: logistic regression models; random forest and decision tree models, support vector machine models, Bayesian network models, various types of deep neural networks (e.g., recurrent neural networks), etc.

A training system (not shown) can use any training technique(s) to train the machine-trained models used by the IAC system 102, such as various types of supervised, semi-supervised, or unsupervised training techniques. For example, in a supervised training technique, the training system can compile a training set that includes images with labels that identify known services and connectors. In a training phase, the service-recognizing component 108 can process these images to detect services in the images. The flow-recognizing component 112 can process the output of the service-recognizing component 108 to detect connectors and node-edge-node relationships. The training system can train these two components (108, 112) to iteratively reduce the discrepancies between their predictions and ground-truth labels associated with the images in the training set.

Similarly, the training system can compile another training set that includes illustrative graph data structures and known attributes associated therewith. For example, the known attributes can describe at least the type of industry, type of organization, and type of deployment environment associated with the graph data structures. In a training phase, the attribute-determining component 118 can predict the attribute values of the graph data structures in the training set. The training system can iteratively decrease the discrepancies between the predictions of the attribute-determining component 118 and the known (ground-truth) attributes specified in the training set.

The training system can compile another training set that includes illustrative graph data structures and associated attributes, together with preferred modifications of those graph data structures. In a training phase, the graph-supplementing component 124 can modify the graph data structures in the training set based on the accompanying attributes. The training system can iteratively decrease the discrepancies between the predictions of the graph-supplementing component 124 and the ground-truth modifications specified in the training set.

The training system can use any technique to perform the above-described operations, such as back projection and stochastic gradient descent. The training system can use any loss function to measure the discrepancies, such as a cross entropy loss function.

B. Illustrative Processes

Figure 19:
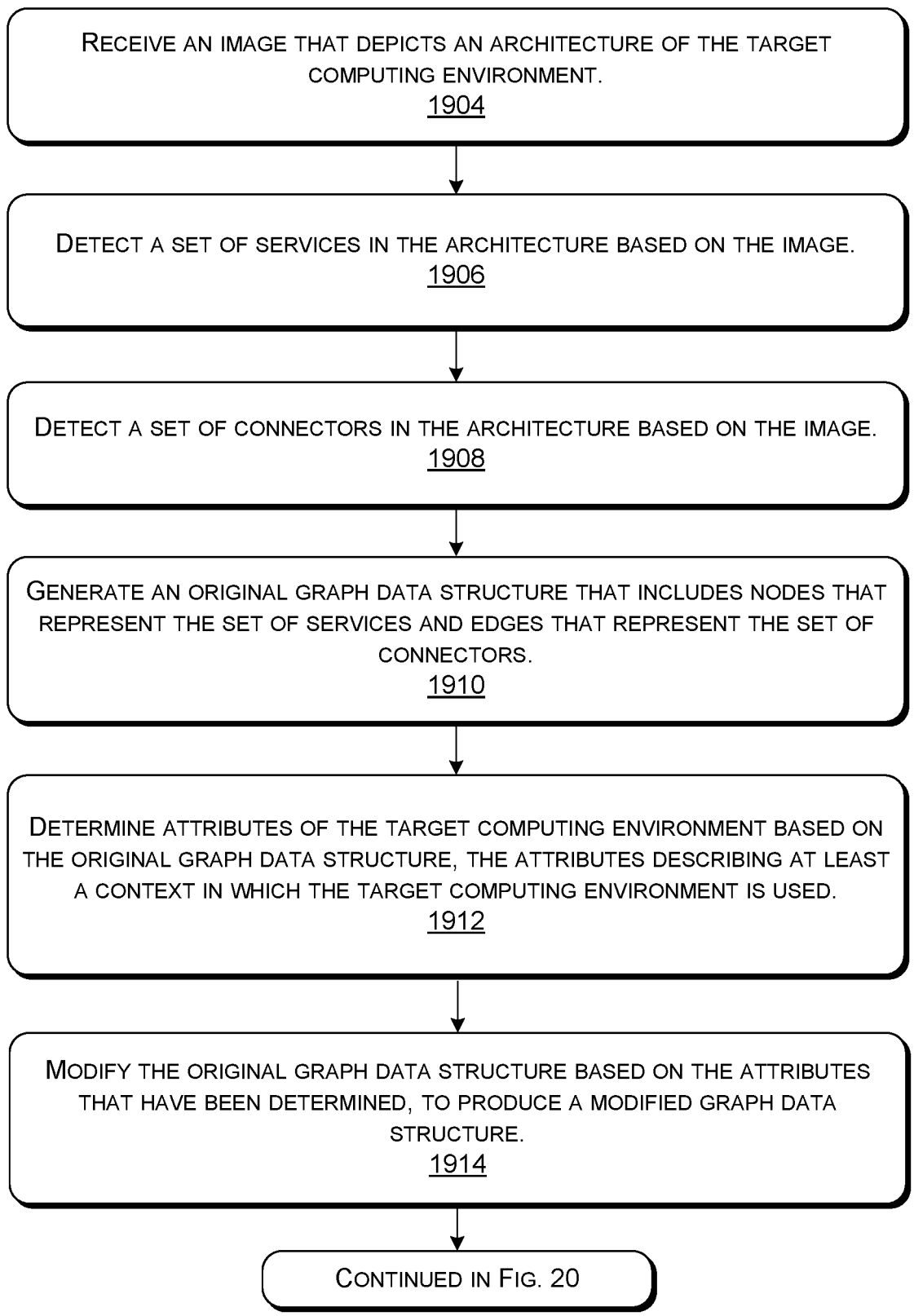
FIGS. 19 and 20 together show a process that explains one manner of operation of the IAC system (of FIG. 1) in flowchart form.
Figures 20, 21:
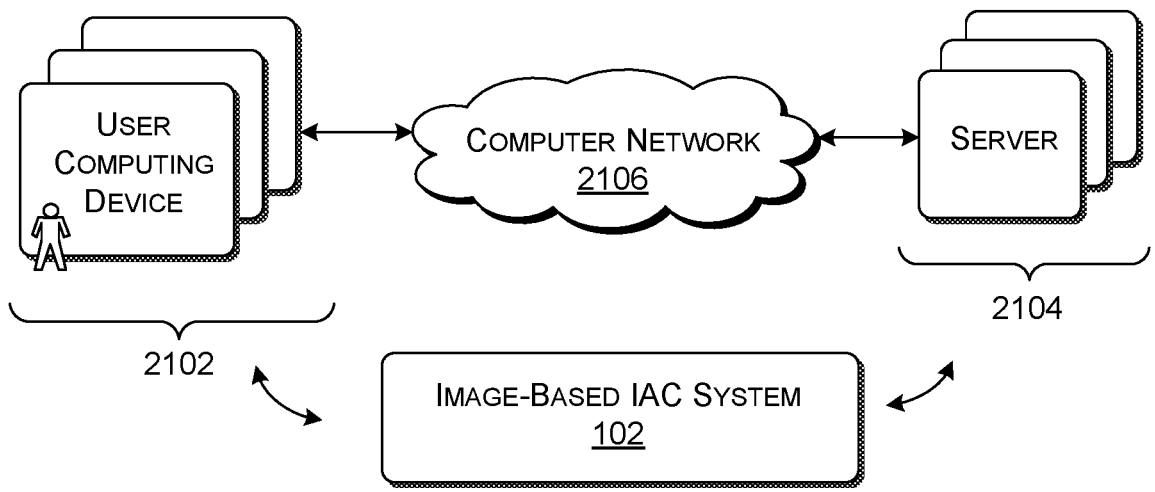
FIG. 21 shows computing equipment that can be used to implement the systems shown in FIG. 1.

FIGS. 19 and 20 show an illustrative process 1902 that explains one manner of operation of the IAC system 102 of Section A in flowchart form. Since the principles underlying the operation of the IAC system 102 have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

In block 1904, the IAC system 102 receives an image 104 that depicts an architecture of the target computing environment 100. In block 1906, the IAC system 102 detects a set of services in the architecture based on the image 104. In block 1908, the IAC system 102 detects a set of connectors in the architecture based on the image 104. In block 1910, the IAC system 102 generates an original graph data structure 116 that includes nodes that represent the set of services and edges that represent the set of connectors. In block 1912, the IAC system 102 determines attributes of the target computing environment 100 based on the original graph data structure 116, the attributes describing at least a context in which the target computing environment 100 is used. In block 1914, the IAC system 102 modifies the original graph data structure 116 based on the attributes that have been determined, to produce a modified graph data structure 126. Advancing to FIG. 20, in block 2002, the IAC system 102 automatically creates configuration information 214 based on the modified graph data structure 126. In block 2004, the IAC system 102 provides the configuration information 214 to a deployment system 222, the deployment system 222 using the configuration information 214 to deploy code that implements the target computing environment 100 on a computing platform 206. The IAC system 102 uses one or more machine-trained models to detect the services, and/or detect the connectors, and/or determine the attributes of the environment, and/or modify the original graph data structure 116. The operations shown in FIG. 20 describe one use of the modified data structure 126 among other possible uses, including any of educational-related uses, demonstration-related uses, simulation-related uses, etc.

C. Representative Computing Functionality

FIG. 21 shows an example of computing equipment that can be used to implement any of the systems summarized above. The computing equipment includes a set of user computing devices 2102 coupled to a set of servers 2104 via a computer network 2106. Each user computing device can correspond to any device that performs a computing function, including a desktop computing device, a laptop computing device, a handheld computing device of any type (e.g., a smartphone, a tablet-type computing device), a mixed reality device, a wearable computing device, an Internet-of-Things (IoT) device, a gaming system, and so on. The computer network 2106 can be implemented as a local area network, a wide area network (e.g., the Internet), one or more point-to-point links, or any combination thereof.

FIG. 21 also indicates that the IAC system 102 can be spread across the user computing devices 2102 and/or the servers 2104 in any manner. For instance, in one case, the IAC system 102 is entirely implemented by one or more of the servers 2104. Each user may interact with the servers 2104 via a browser application or other programmatic interfaces provided by a user computing device. In another case, the IAC system 102 is entirely implemented by a user computing device in local fashion, in which case no interaction with the servers 2104 is necessary. In another case, the functionality associated with the IAC system 102 is distributed between the servers 2104 and each user computing device in any manner.

Figure 22:
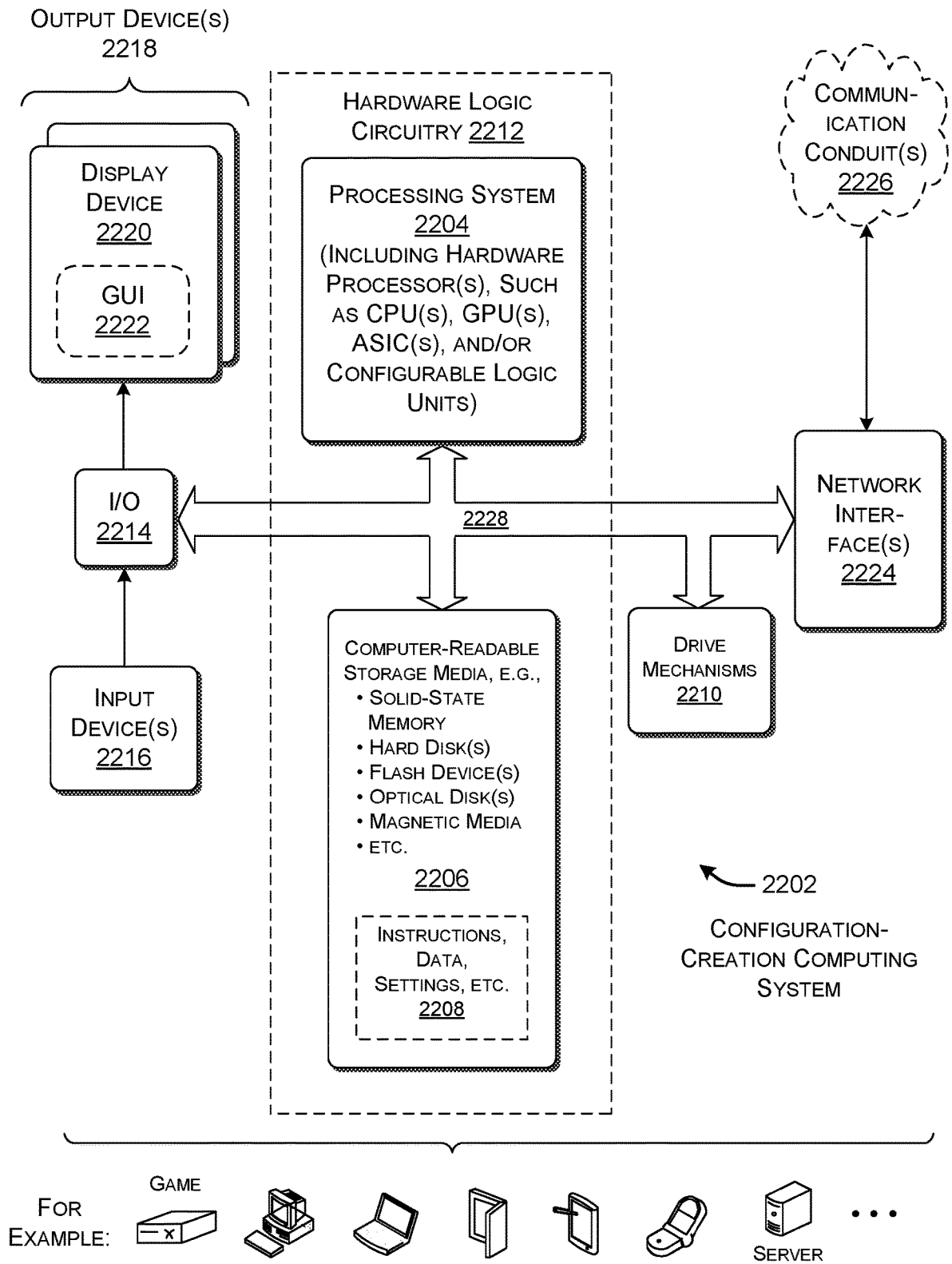
FIG. 22 shows an illustrative type of computing system that can be used to implement any aspect of the features shown in the foregoing drawings.

FIG. 22 shows a computing system 2202 that can be used to implement any aspect of the mechanisms set forth in the above-described figures. For instance, the type of computing system 2202 shown in FIG. 22 can be used to implement any user computing device or any server shown in FIG. 21. In all cases, the computing system 2202 represents a physical and tangible processing mechanism.

The computing system 2202 can include a processing system 2204 having one or more hardware processors. The hardware processor(s) can include, without limitation, one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any hardware processor can correspond to a general-purpose processing unit or an application-specific processor unit.

The computing system 2202 can also include computer-readable storage media 2206, corresponding to one or more computer-readable media hardware units. The computer-readable storage media 2206 retains any kind of information 2208, such as machine-readable instructions, settings, and/or data. Without limitation, the computer-readable storage media 2206 may include one or more solid-state devices, one or more magnetic hard disks, one or more optical disks, magnetic tape, and so on. Any instance of the computer-readable storage media 2206 can use any technology for storing and retrieving information. Further, any instance of the computer-readable storage media 2206 may represent a fixed or removable unit of the computing system 2202. Further, any instance of the computer-readable storage media 2206 may provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media.

The computing system 2202 can utilize any instance of the computer-readable storage media 2206 in different ways. For example, any instance of the computer-readable storage media 2206 may represent a hardware memory unit (such as Random Access Memory (RAM)) for storing transient information during execution of a program by the computing system 2202, and/or a hardware storage unit (such as a hard disk) for retaining/archiving information on a more permanent basis. In the latter case, the computing system 2202 also includes one or more drive mechanisms 2210 (such as a hard drive mechanism) for storing and retrieving information from an instance of the computer-readable storage media 2206.

The computing system 2202 may perform any of the functions described above when the processing system 2204 carries out computer-readable instructions stored in any instance of the computer-readable storage media 2206. For instance, the computing system 2202 may carry out computer-readable instructions to perform each block of the processes described in Section B. FIG. 22 generally indicates that hardware logic circuitry 2212 includes any combination of the processing system 2204 and the computer-readable storage media 2206.

Alternatively, or in addition, the processing system 2204 may include one or more other configurable logic units that perform operations using a collection of logic gates. For instance, the configurable logic units may include a fixed configuration of hardware logic gates, e.g., that are created and set at the time of manufacture, and thereafter unalterable. Alternatively, or in addition, the other configurable logic units may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc. In these implementations, the processing system 2204 can also be said to incorporate a storage device that stores computer-readable instructions, insofar as the configurable logic units are configured to execute the instructions and therefore embody or store these instructions.

In some cases (e.g., in the case in which the computing system 2202 represents a user computing device), the computing system 2202 also includes an input/output interface 2214 for receiving various inputs (via input devices 2216), and for providing various outputs (via output devices 2218). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes), and so on. One particular output mechanism may include a display device 2220 and an associated graphical user interface presentation (GUI) 2222. The display device 2220 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 2202 can also include one or more network interfaces 2224 for exchanging data with other devices via one or more communication conduits 2226. One or more communication buses 2228 communicatively couple the above-described units together.

The communication conduit(s) 2226 can be implemented in any manner, e.g., by a local area computer network, a wide area computer network (e.g., the Internet), point-to-point connections, etc., or any combination thereof. The communication conduit(s) 2226 can include any combination of hardwired links, wireless links, routers, gateway functionality, name servers, etc., governed by any protocol or combination of protocols.

FIG. 22 shows the computing system 2202 as being composed of a discrete collection of separate units. In some cases, the collection of units corresponds to discrete hardware units provided in a computing device chassis having any form factor. FIG. 22 shows illustrative form factors in its bottom portion. In other cases, the computing system 2202 can include a hardware logic unit that integrates the functions of two or more of the units shown in FIG. 1. For instance, the computing system 2202 can include a system on a chip (SoC or SOC), corresponding to an integrated circuit that combines the functions of two or more of the units shown in FIG. 22.

The following summary provides a non-exhaustive set of illustrative examples of the technology set forth herein.

(A1) According to a first aspect, some implementations of the technology described herein include a method (e.g., the process 1902) for creating configuration information (e.g., 214) used to build a target computing environment (e.g., 100). The method includes: receiving (e.g., in block 1904) an image (e.g., 104) that depicts an architecture of the target computing environment; detecting (e.g., in block 1906) a set of services in the architecture based on the image; detecting (e.g., in block 1908) a set of connectors in the architecture based on the image; generating (e.g., in block 1910) an original graph data structure (e.g., 116) that includes nodes that represent the set of services and edges that represent the set of connectors; determining (e.g., 1912) attributes of the target computing environment based on the original graph data structure, the attributes describing at least a context in which the target computing environment is used; modifying (e.g., 1914) the original graph data structure based on the attributes that have been determined, to produce a modified graph data structure (e.g., 126); automatically creating (e.g., 2002) the configuration information based on the modified graph data structure; and providing (e.g., 2004) the configuration information to a deployment system (e.g., 222), the deployment system using the configuration information to deploy code that implements the target computing environment on a computing platform (e.g., 206). In some implementations, the method uses one or more machine-trained models to detect the service, and/or detect the connectors, and/or determine the attributes of the environment, and/or modify the original graph data structure.

(A2) According some implementations of the method of A1, the operation of detecting a set of services includes using the one or more machine-trained models to automatically detect text in the image and to automatically detect types of icons that appear in the image.

(A3) According some implementations of any of the methods of A1 or A2, the operation of detecting a set of connectors in the image uses the one or more machine-trained models to detect a type of a particular connector of the set of connectors and a direction of the particular connector.

(A4) According some implementations of any of the methods of A1-A3, the method further includes determining a set of relations among the services in the set of services, and validating the set of relations using a data store that defines permissible relations.

(A5) According some implementations of the method of A4, the operation of determining a set of relations automatically modifies a particular relation in the set of relations in response to determining that the particular relation is not present in the data store of permission relations.

(A6) According some implementations of any of the methods of A1-A5, the operation of determining attributes is performed, at least in part, by using text that appears in the image to determine one or more attributes that describe the context in which the target computing environment is used.

(A7) According some implementations of any of the methods of A1-A6, the operation of determining attributes is performed, at least in part, by matching the original graph data structure with other graph data structures associated with other architectures.

(A8) According some implementations of any of the methods of A1-A7, the operation of determining attributes includes finding a dataset that describes the context associated with the target computing environment, and extracting the attributes from the dataset.

(A9) According some implementations of any of the methods of A1-A8, the context in which the target computing environment is used is described by at least: a type industry in which the target computing environment is used; a type of organizational entity that uses the target computing environment; and a stage of development in which the target computing environment is used.

(A10) According some implementations of any of the methods of A1-A9, the attributes also include at least one attribute that specifies a size of the target computing environment.

(A11) According some implementations of any of the methods of A1-A10, the attributes also include a particular attribute that is determined based on a distribution of attributes over plural target computing environments in a class of target computing environments.

(A12) According some implementations of any of the methods of A1-A11, the operation of modifying adds at least one node and/or edge to the original graph data structure.

(A13) According some implementations of any of the methods of A1-A12, the operation of modifying adds at least one architectural feature and/or operating characteristic to the target computing environment to improve security and/or reliability and/or monitoring capability of the target computing environment.

In yet another aspect, some implementations of the technology described herein include a computing system (e.g., IAC system 102, computing system 2202) for creating configuration information (e.g., 214) used to build a target computing environment (e.g., 100). The computing system includes a storage device (e.g., 2206) for storing machine-readable instructions (e.g., 2208), and a processing system (e.g., 2204) for executing the machine-readable instructions to perform any of the methods described herein (e.g., the methods A1-A13).

In yet another aspect, some implementations of the technology described herein include a computer-readable storage medium (e.g., 2206) for storing computer-readable instructions (e.g., 2208). A processing system (e.g., 2204) having one or more hardware processors execute computer-readable instructions to perform any of the methods described herein (e.g., methods A1-A13).

More generally stated, any of the individual elements and steps described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuitry 2214 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for creating configuration information used to build a target computing environment using one or more machine-trained models, comprising:
   receiving an image that depicts an architecture of the target computing environment;
   detecting a set of services in the architecture based on the image;
   detecting a set of connectors in the architecture based on the image;
   generating an original graph data structure that includes nodes that represent the set of services and edges that represent the set of connectors;
   determining a first subset of attributes of the target computing environment by mapping, using the one or more machine-trained models, the original graph data structure and accompanying text into the first subset of attributes, the first subset of attributes describing a context in which the target computing environment is to be used, the first subset of attributes being associated with a particular class selected from among a plurality of classes, each of the plurality of classes being associated with a particular industry, a particular type of organization, and a particular stage of deployment;
   modifying the original graph data structure based on the first subset of attributes that have been determined, to produce a modified graph data structure; and
   automatically creating the configuration information based on the modified graph data structure;
   providing the configuration information to a deployment system; and
   using, by the deployment system, the configuration information to deploy code that implements the target computing environment on a computing platform.

2. The method of claim 1, wherein said detecting a set of services includes using the one or more machine-trained models to automatically detect text in the image and to automatically detect types of icons that appear in the image.

3. The method of claim 1, wherein said detecting a set of connectors in the image uses the one or more machine-trained models to detect a type of a particular connector of the set of connectors and a direction of the particular connector.

4. The method of claim 1, further including determining a set of relations among the set of services, and validating the set of relations using a data store that defines permissible relations.

5. The method of claim 4, wherein said determining a set of relations automatically modifies a particular relation in the set of relations in response to determining that the particular relation is not present in the data store of permissible relations.

6. The method of claim 1, wherein said mapping is performed, at least in part, by using text that appears in the image to determine one or more attributes that describe the context in which the target computing environment is used, by matching the text that appears in the image with text associated with the particular class.

7. The method of claim 1, wherein said mapping is performed, at least in part, by matching the original graph data structure with other graph data structures associated with other architectures.

8. The method of claim 1, further comprising extracting additional attributes from a particular class-specific dataset associated with the particular class, the particular class-specific dataset being selected from among a plurality of class-specific datasets.

9. The method of claim 8, wherein the additional attributes include at least one attribute that specifies a size of the target computing environment.

10. The method of claim 8, wherein the additional attributes include a particular attribute that is determined based on a distribution of attributes over plural target computing environments associated with the particular class.

11. The method of claim 1, wherein said modifying adds at least one node and/or edge to the original graph data structure.

12. The method of claim 1, wherein said modifying adds at least one architectural feature and/or operating characteristic to the target computing environment to improve security and/or reliability and/or monitoring capability of the target computing environment.

13. A computing system for creating configuration information used to build a target computing environment, the computing system comprising:
   a storage device storing machine-readable instructions;
   a processing system having one or more hardware processors for executing the machine-readable instructions to perform operations including:
   receiving an image that depicts an architecture of the target computing environment;
   detecting, using machine-trained logic, a set of services in the architecture based on the image;
   detecting, using the machine-trained logic, a set of connectors in the architecture based on the image;
   generating an original graph data structure that includes nodes that represent the set of services and edges that represent the set of connectors;

determining a first subset of attributes of the target computing environment by mapping, using the machine-trained logic, the original graph data structure and accompanying text into the first subset of attributes, the first subset of attributes describing a context in which the target computing environment is to be used, the first subset of attributes being associated with a particular class selected from among a plurality of classes, the plurality of classes being associated with different respective contexts of use;

extracting additional attributes from a particular class-specific dataset associated with the particular class, the particular class-specific dataset being selected from among a plurality of class-specific datasets;

modifying the graph data structure based on the first subset of attributes and the additional attributes that have been determined, to produce a modified graph data structure;

automatically creating configuration information based on the modified graph data structure;

providing the configuration information to a deployment system; and using, by the deployment system, the configuration information to deploy code that implements the target computing environment on a computing platform.

14. The computing system of claim 13, wherein said mapping is performed, at least in part, by using text that appears in the image to determine one or more attributes that describe the context in which the target computing environment is used, by matching the text that appears in the image with text associated with the particular class.

15. The computing system of claim 13, wherein said mapping is performed, at least in part, by matching the original graph data structure with other graph data structures associated with other network architectures.

16. The computing system of claim 13, wherein the particular class is associated with:
- a type industry in which the target computing environment is used;
- a type of organizational entity in which the target computing environment is used; and
- a stage of development in which the target computing environment is used.

17. The computing system of claim 13, wherein the additional attributes include a particular attribute that is determined based on a distribution of the particular attribute over plural target computing environments in a class of target computing environments.

18. The computing system of claim 13, wherein said modifying adds at least one node and/or edge to the original graph structure to improve security and/or reliability and/or monitoring capability of the target computing environment.

19. A computer-readable storage medium storing computer-readable instructions, one or more hardware processors executing the computer-readable instructions to perform operations that comprise:

receiving an image that depicts an architecture of a target computing environment;

detecting a set of services in the architecture based on the image;

detecting a set of connectors in the architecture based on the image;

generating an original graph data structure that includes nodes that represent the set of services and edges that represent the set of connectors;

determining a first subset of attributes of the target computing environment by mapping, using one or more machine-trained models, the original graph data structure and accompanying text into the first subset of attributes, the first subset of attributes describing a context in which the target computing environment is to be used, the first subset of attributes being associated with a particular class selected from among a plurality of classes, each of the plurality of classes being associated with a particular industry, a particular type of organization, and a particular stage of deployment;

modifying the original graph data structure based on the first subset of attributes that have been determined, to produce a modified graph data structure;

creating system configuration information based on the modified graph data structure; and using the configuration information to deploy code that implements the target computing environment on a computing platform.

\* \* \* \* \*